United States Patent
Asakawa et al.

(10) Patent No.: US 8,687,274 B2
(45) Date of Patent: *Apr. 1, 2014

(54) SHORT-WAVELENGTH POLARIZING ELEMENTS AND THE MANUFACTURE AND USE THEREOF

(75) Inventors: Koji Asakawa, Kawasaki (JP); Vincent Pelletier, Saint-Basile-le-Grand (CA); Mingshaw Wu, San Jose, CA (US); Douglas H. Adamson, Mansfield Center, CT (US); Richard A. Register, Princeton Junction, NJ (US); Paul M. Chaikin, New York City, NY (US); Young-Rae Hong, Princeton, NJ (US)

(73) Assignees: Kabushiki Kaisha Toshiba, Tokyo (JP); Princeton University, Princeton, NJ (US)

( * ) Notice: Subject to any disclaimer, the term of this patent is extended or adjusted under 35 U.S.C. 154(b) by 797 days.

This patent is subject to a terminal disclaimer.

(21) Appl. No.: 12/091,668

(22) PCT Filed: Oct. 31, 2006

(86) PCT No.: PCT/US2006/042378
§ 371 (c)(1),
(2), (4) Date: Dec. 15, 2008

(87) PCT Pub. No.: WO2007/053579
PCT Pub. Date: May 10, 2007

(65) Prior Publication Data
US 2009/0219617 A1 Sep. 3, 2009

Related U.S. Application Data

(63) Continuation-in-part of application No. 11/532,908, filed on Sep. 19, 2006, now abandoned.

(60) Provisional application No. 60/732,005, filed on Oct. 31, 2005.

(51) Int. Cl.
*G02B 5/30* (2006.01)
(52) U.S. Cl.
CPC .................................. *G02B 5/3075* (2013.01)
USPC .................................... 359/485.01; 359/352
(58) Field of Classification Search
None
See application file for complete search history.

(56) References Cited

U.S. PATENT DOCUMENTS 6,943,941 B2 * 9/2005 Flagello et al. ............... 359/352
2003/0227678 A1 12/2003 Lines et al.
(Continued)

FOREIGN PATENT DOCUMENTS

JP 2004-177904 A 6/2004
JP 2004-179172 A 6/2004
(Continued)

OTHER PUBLICATIONS

Japanese Office Action dated Dec. 7, 2010, issued in corresponding Japanese Patent Application No. 2006-297180.
(Continued)

*Primary Examiner* — Derek S Chapel
(74) *Attorney, Agent, or Firm* — Westerman, Hattori, Daniels & Adrian, LLP

(57) ABSTRACT

While gold wire grids have been used to polarize infrared wavelengths for over a hundred years, they are not appropriate for shorter wavelengths due to their large period. With embodiments of the present invention, grids with periods a few tens of nanometers can be fabricated. Among other things, such grids can be used to polarize visible and even ultraviolet light. As a result, such wire grid polarizers have a wide variety of applications and uses, such as, e.g., in the fabrication of semiconductors, nanolithography, and more.

16 Claims, 11 Drawing Sheets

(56) References Cited

U.S. PATENT DOCUMENTS

| | | | |
|---|---|---|---|
| 2004/0125449 A1* | 7/2004 | Sales | 359/486 |
| 2004/0201889 A1* | 10/2004 | Wang et al. | 359/486 |
| 2004/0227446 A1* | 11/2004 | Fujimoto et al. | 313/110 |
| 2004/0239833 A1* | 12/2004 | Kawazu et al. | 349/96 |
| 2005/0046943 A1 | 3/2005 | Suganuma | |
| 2007/0183025 A1 | 8/2007 | Asakawa et al. | |
| 2007/0183035 A1 | 8/2007 | Asakawa et al. | |

FOREIGN PATENT DOCUMENTS

| | | |
|---|---|---|
| JP | 2005-7244 A | 1/2005 |
| JP | 2005-141288 A | 6/2005 |
| JP | 2005-148416 A | 6/2005 |
| JP | 2005-292835 A | 10/2005 |
| JP | 2007-57876 A | 3/2007 |

OTHER PUBLICATIONS

International Search Report, dated Mar. 7, 2008.
Japanese Office Action dated Feb. 28, 2012, issued in corresponding Japanese Patent Application No. 2006-297180.
Japanese Office Action dated Jan. 15, 2013, issued in corresponding Japanese Patent Application No. 2006-297180 (all other cited references previously submitted)(w/ English translation).

* cited by examiner

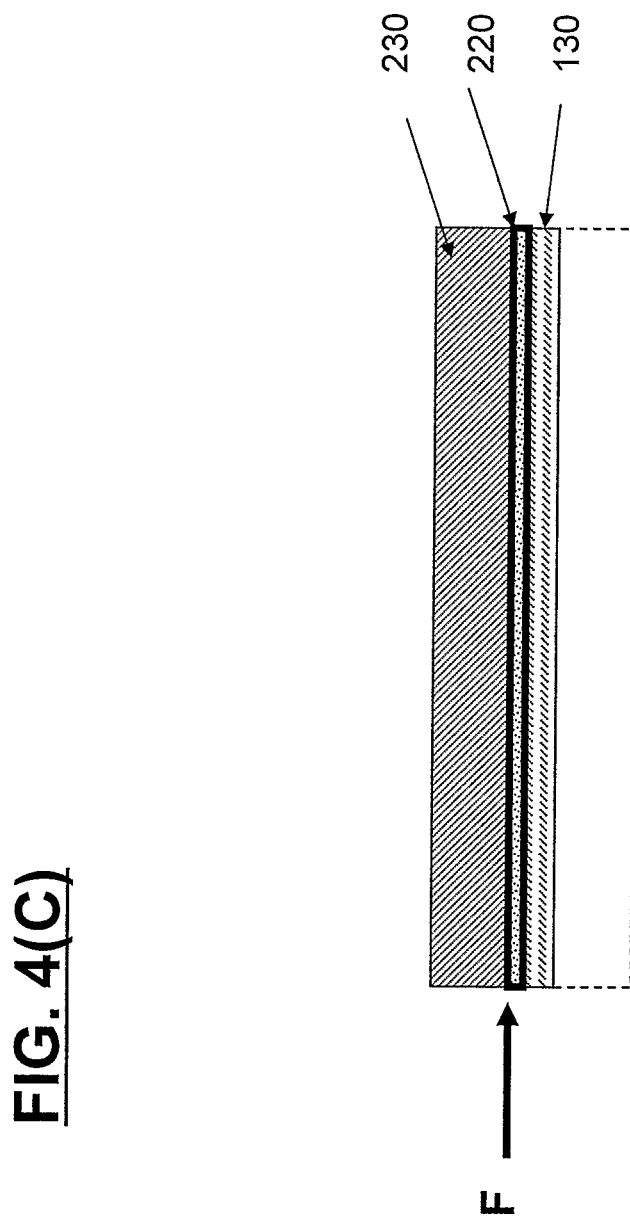

FIG. 7  Crossover

SHORT-WAVELENGTH POLARIZING ELEMENTS AND THE MANUFACTURE AND USE THEREOF

The present application claims priority to U.S. Provisional Patent Application Ser. No. 60/732,005, filed on Oct. 31, 2005, entitled SHORT-WAVELENGTH POLARIZING ELEMENTS AND THE MANUFACTURE AND USE THEREOF, to K. Asakawa, et al., the entire disclosure of which is incorporated herein by reference.

BACKGROUND OF THE INVENTION

1. Field of the Invention

The present invention relates to polarizing elements and to the manufacture and use thereof. Some preferred embodiments relate to short-wavelength polarizing elements, to methods of manufacturing such polarizing elements, to methods of evaluating exposure apparatuses using such polarizing elements, and/or to methods of manufacturing semiconductor devices using such exposure apparatuses.

2. Description of the Background

In the related art, exposure apparatuses have been widely used to expose circuit patterns for liquid crystal displays or semiconductor devices. Typically, the exposure apparatus performs a so-called lithography process, in which an original pattern formed on a photomask is reduced and transferred to the substrate. With requirements for smaller features in semiconductor devices, shorter-wavelength light sources and larger-diameter projection optical systems have been promoted to achieve higher lithographic resolution. An exposure apparatus with a numerical aperture (NA) of 0.9 or more using an ArF excimer laser (e.g., 193 nm wavelength) is currently entering the practical application stage. In addition, an ArF immersion-type exposure apparatus has been developed, wherein liquid fills the space between the lowest lens of the projection optical system and the substrate; this apparatus can provide an air-equivalent NA of 1.0 or more. An exposure apparatus has also been developed which uses an $F_2$ excimer laser (e.g., 157 nm wavelength). In addition, an $F_2$ immersion-type exposure apparatus has also been discussed.

Although polarization has not been a significant concern in conventional exposure apparatuses, in such larger-diameter exposure apparatuses, polarization of the light is an important factor. Notably, conventional exposure apparatuses often convert the light from the laser source into an unpolarized state before illuminating the mask. Unpolarized light comprises s-polarized and p-polarized components of equal magnitude; the p-polarized component decreases the image contrast in a larger-diameter exposure apparatus. Therefore, prior to projection, the exposure apparatus needs to reduce the p-polarized component; in the limit where only the s-polarized light remains, tangential linear polarization is obtained, though this limit need not be reached for the lithographic resolution to be enhanced.

An optical element called a polarizer, or polarizing element, is used to control the polarization state. Polarizers can be divided into prism-type and filter-type elements. Prism-type polarizers use the birefringence of optically transmissive crystals such as calcite, or Brewster-angle reflection, or the like. Prism-type elements can yield a high degree of polarization, as gauged by the extinction of light transmitted through two such polarizers in a crossed configuration. However, prism-type elements produce a substantial deflection between the incoming and outgoing light rays. Moreover, they are relatively thick which, thus, requires a larger installation space within the exposure apparatus. Moreover, they have a small viewing angle.

While filter-type polarizers generally have poorer polarization characteristics than prism-type polarizers, they have the important advantages in that they can be formed as thin devices, requiring a smaller installation space within an exposure apparatus and in that normally-incident light can be polarized with no deflection of the beam. Furthermore, they have a larger viewing angle and can effectively polarize obliquely-incident light. By way of example, a filter-type polarizer for visible light can be formed by rolling in one direction a glass mixed with conductive particles such as silver halide, thereby forming the silver halide particles into an elongated shape. These elongated silver halide particles produce an anisotropic electric conductivity that imparts the polarization characteristics to the composite material. However, such polarizers are ineffective for ultraviolet (UV) light because materials which are transparent to UV light, such as fluorite or fluorine-doped amorphous quartz or the like, cannot be rolled to produce orientation of embedded particles.

Another well-known filter-type polarizing element is a wire grid polarizer (WGP). Typically, a WGP includes a glass substrate on which thin parallel lines of a metal, such as aluminum or gold, are equally spaced. The WGP possesses anisotropic electric conductivity, as in the above-described polarization filter. The WGP needs to have the thin metal lines located at an interval sufficiently smaller than the wavelength of the light to alter its polarization. Thus, WGPs are currently employed only at infrared wavelengths and longer due to the limits of conventional machining.

It has been reported that electron beam lithography can produce a WGP with a period of approximately 200 nm, which can effect polarization of visible light. See U.S. Pat. No. 6,108,131 incorporated herein by reference in its entirety. It has also been reported that a 50 nm half pitch (100 nm interval) WGP was fabricated by nanoimprint lithography that polarizes the light at 450 nm wavelength. See She-Won Ahn, et al., Nanotechnology, Institute of Physics Publishing, Vol. 16 (2005), pp. 1874-1877, incorporated herein by reference in its entirety. However, such a WGP cannot polarize light in the deep-UV region (e.g., with a wavelength of about 200 nm or less).

To polarize the light from an ArF excimer laser (e.g., 193 nm wavelength) or an $F_2$ excimer laser (e.g., 157 nm wavelength) with a WGP, the metal lines would need to be spaced at an interval of 50 nm or less, which was unachievable with current electron-beam machining technology. While a variety of systems and methods are known, there remains a need for improved systems and methods that can overcome the foregoing and other deficiencies of existing systems.

SUMMARY

The preferred embodiments of the present invention can significantly improve upon existing systems and methods.

While wire grids have been used to polarize infrared wavelengths for over a hundred years, they are not appropriate for shorter wavelengths due to their large period. With embodiments of the present invention, grids with periods a few tens of nanometers can be fabricated. Among other things, such grids can be used to polarize visible and even ultraviolet light. As a result, such WGPs have a wide variety of applications and uses, such as, e.g.:
  Fabrication of semiconductors;
  Nanolithography;
  Astrophysics (e.g., analyzing UV radiation with satellites); and
  Analyzer at synchrotron sources.

According to some illustrative embodiments, a polarizing element is provided that includes: a substrate transparent to light; a polarization layer formed on the substrate; the polarization layer having polarization characteristics for the light; the polarization layer including an anisotropic striped structure parallel to the substrate; the striped structure having an average continuous distance of two or more times the lights wavelength in a longitudinal direction and having an average interval less than half of the light's wavelength in a transverse direction; and wherein the polarization layer is formed by block copolymer lithography in which a pattern of block copolymer microdomains is transferred to the polarization layer.

In some examples, the striped structure is formed such that a plurality of the stripes have their longitudinal directions lying in parallel along a surface of the transparent substrate. In some examples, the light is ultraviolet light with a wavelength of below 300 nm, or, in some examples, below 250 nm, or, in some examples, below 200 nm, or, in some examples, below 175 nm.

In some examples, the polarization layer consists substantially of a substance having a higher plasma frequency than the frequency of the ultraviolet light. In some examples, the polarization layer consists substantially of aluminum, silicon, and/or beryllium. In some preferred embodiments, the polarization layer mainly consists of silicon.

According to some other examples, a method of forming a polarizing element is provided that includes forming the polarization layer by block copolymer lithography, including transferring a pattern of block copolymer microdomains to the polarization layer.

According to some other embodiments, a polarizing element with a substrate transparent to incident ultraviolet light and a polarization layer having polarization characteristics for the incident ultraviolet light is provided that includes: a polarization layer including two layers of striped structures, with the two layers of striped structures oriented substantially parallel to each other, and wherein the distance between the two layers is smaller than an incident ultraviolet light wavelength. In some examples, the striped structures have an average continuous distance of two or more times the incident ultraviolet light wavelength in a longitudinal direction and have an average interval of less than half of the light incident ultraviolet light wavelength in a transverse direction. In some examples, the two layers of striped structures are oriented in the same direction, and the reflecting portions of the two layers are interdigitated. In some examples, the polarization layer consists substantially of a substance having a higher plasma frequency than the frequency of the ultraviolet light.

According to some other embodiments, a method of manufacturing a polarizing element having polarization characteristics for incident ultraviolet light with a wavelength below 300 nm is performed that includes: generating and orienting the cylindrical or lamellar microdomains of a block copolymer thin film on a transparent substrate; transferring the pattern of block copolymer microdomains into the substrate and/or a thin film on the substrate to form grooves; and depositing a substance having reflection characteristics suitable for ultraviolet light with a wavelength below 300 nm. In some embodiments, the method further includes removing all or part of the thin film. In some embodiments, the method further includes that the generating and orienting the cylindrical or lamellar microdomains of a block copolymer thin film includes applying shear stress or flow. In some embodiments, the method further includes forming a thin layer of an organic polymer on the transparent substrate. In some embodiments, the method further includes forming a thin layer of an inorganic substance on the organic polymer layer or the transparent substrate. In some embodiments, the method further includes forming a thin layer of a block copolymer on the inorganic substance layer. In some embodiments, the method further includes transferring a block copolymer microdomain pattern to the inorganic substance layer and organic polymer layer forming the grooves.

According to some embodiments, a method employing a polarizing element for evaluating an exposure apparatus which uses an excimer laser as a light source, which projects light from the excimer laser onto a mask pattern through an illumination optical system, and which reduces and projects the mask pattern onto a wafer substrate through a projection optical system is performed that includes: evaluating the polarization-conversion characteristics of the illumination optical system or the projection optical system, or evaluating the polarization state of the excimer laser light when it reaches the wafer substrate, including: providing a polarizing element which includes a transparent substrate and a polarization layer thereon, the polarization layer having polarization characteristics for the excimer laser light, wherein the polarization layer includes an anisotropic striped structure substantially parallel to the transparent substrate, and wherein the striped structure has an average continuous distance of two or more times the ultraviolet light wavelength in a longitudinal direction and has an average interval of less than half of the ultraviolet light wavelength in a transverse direction, and wherein the striped structure is formed such that a plurality of the stripes have their longitudinal directions lying substantially in parallel along a surface of the transparent substrate; and locating the polarizing element between the illumination optical system and the projection optical system or downstream of the projection optical system.

According to some other embodiments, a method of manufacturing a semiconductor device using a polarizing element employed within an exposure apparatus which uses an excimer laser as a light source, illuminates the excimer laser light onto a mask pattern through a illumination optical system, and reduces and projects the mask pattern onto a wafer substrate through a projection optical system is performed that includes: evaluating the polarization-conversion characteristics of the illumination optical system or the projection optical system, or evaluating the polarization state of the excimer-laser light when it reaches the wafer substrate, and using the evaluation as a basis to adjust the illumination optical system or the projection optical system, and then exposing the wafer substrate to the excimer-laser light to manufacture the semiconductor device, including: using a polarizing element which includes a transparent substrate and a polarization layer located thereon, the polarization layer having polarization characteristics for the excimer-laser light, wherein the polarization layer is an anisotropic striped structure, wherein the striped structure has an average continuous distance of two or more times an incident ultraviolet light wavelength in the longitudinal direction and has an average interval less than half of the ultraviolet light wavelength in the transverse direction, and wherein the striped structure is formed such that a plurality of the stripes have their longitudinal directions lying in parallel along a surface of the transparent substrate; and locating the polarizing element between the illumination optical system and the projection optical system or downstream of the projection optical system.

According to some other embodiments, a wire grid polarizer is provided that includes: a plurality of wires arranged substantially in parallel, with the wires located at intervals having a separation distance sufficient to polarize light having a wavelength of 300 nm or less, wherein the polarizer polarizes ultraviolet light. In some embodiments, the wires are located at intervals having a separation distance sufficient to polarize light having a wavelength of 200 nm or less, or, in some embodiments, to polarize light having a wavelength of 175 nm or less, or, in some embodiments, to polarize light having a wavelength of 160 nm or less. In some examples, the wires are made substantially with silicon.

According to some other embodiments, a wire grid polarizer is provided that includes: a plurality of wires arranged substantially in parallel, wherein the wires are spaced at intervals of about 100 nm or less, and wherein the polarizer polarizes ultraviolet light. In some embodiments, the wires are spaced at intervals of less than about 50 nm. In some embodiments, the polarizer includes a plurality of layers of wires, and, in some embodiments, the plurality of layers includes two or more interdigitated but not interconnected arrays of wires supported on a substrate.

According to some examples, a method of aligning wires of the polarizing element includes shearing the polarizer element.

According to some examples, a method of fabricating the polarizing element includes using a self-assembling block copolymer thin film as a mask. In some examples, the method further includes imparting long-range order of microdomains to the film separately. In some examples, the method further includes imparting long-range order of microdomains by applying a shear force.

According to some other embodiments, a wire grid polarizer is provided that includes: a plurality of reflective wires arranged substantially in parallel, wherein the reflective wires are made with Silicon.

According to some other embodiments, a wire grid polarizer is provided that includes: a plurality of reflective wires arranged substantially in parallel, wherein the polarizer is effective at polarizing light in frequencies between a plasma frequency and √2 of the plasma frequency with the grid rotated by about 90 degrees from its long-wavelength orientation to achieve the same polarization direction for a transmitted light.

According to some other embodiments, a method of polarizing light with a wire grid polarizer is performed that includes: polarizing light with frequencies ω as high as $\omega_p$, wherein for $1<\omega_p/\omega<\sqrt{1/r}$, the grid is rotated by about 90 degrees from its long-wavelength orientation to achieve substantially the same polarization direction for the transmitted light.

According to some other embodiments, a method of polarizing light with a wire grid polarizer is performed that includes: polarizing light with a polarizing element in which there is a crossover frequency at $$\omega=\omega_p/\sqrt{2}$$

and below which frequency the grid cannot react fast enough to electric field changes, and E-polarization becomes transparent and H-polarization becomes reflective.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 4(C) is a schematic diagram depicting the application of a shear force to a film according to some illustrative embodiments;

DETAILED DESCRIPTION

Figure 1:
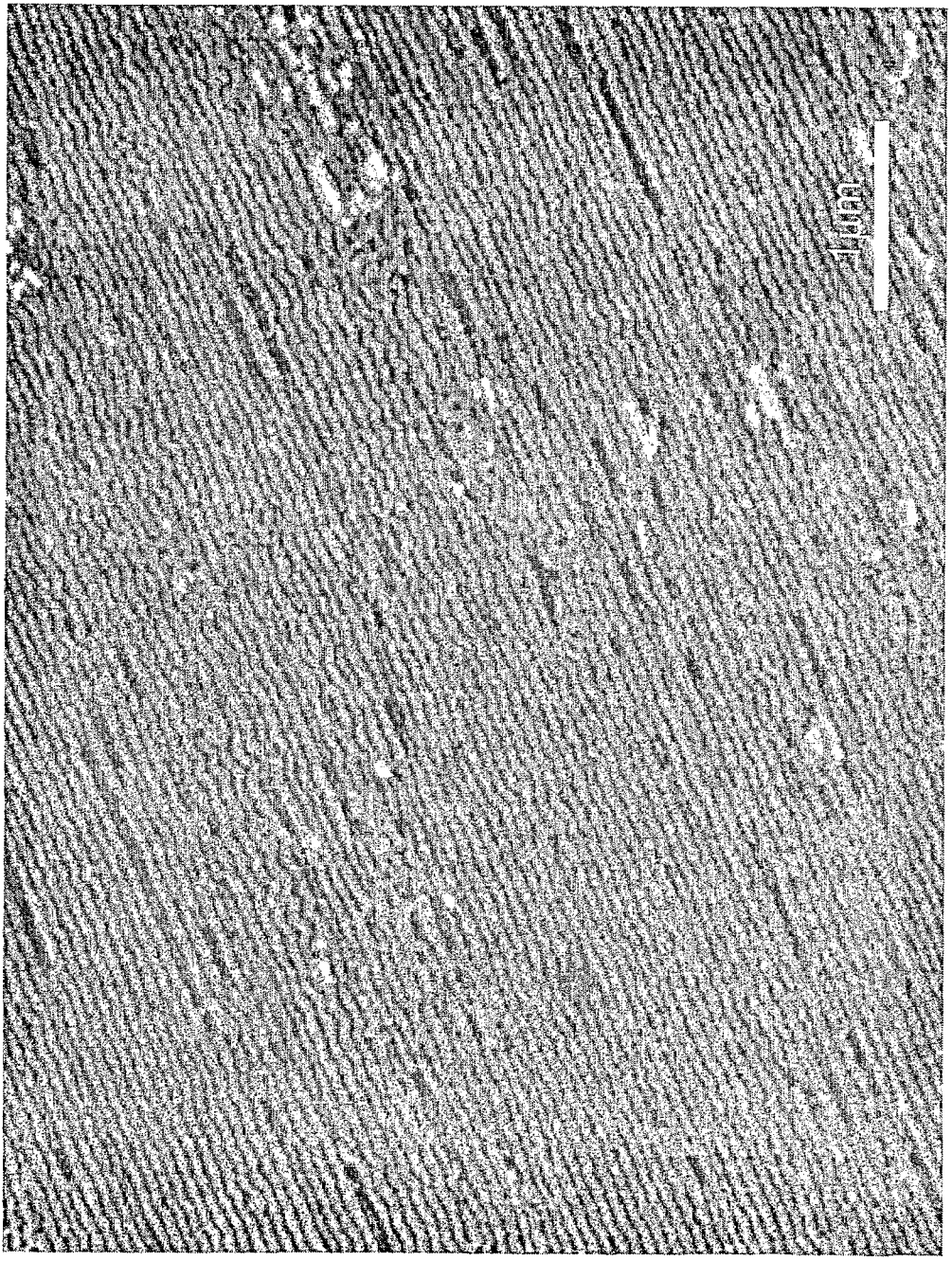
FIG. 1 shows an exemplary wire grid pattern according to some of the preferred embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein. The basic principle of the present invention will first be described below. This description is simplified for the convenience of easily understanding the present invention, and hence this example should not be taken as limiting the embodiments of the present invention.

A polarizing element according to some preferred embodiments of the present invention includes a smooth glass substrate and a polarization layer formed thereon. In the preferred embodiments, the polarization layer can alter the polarization state of light, especially UV light with wavelength below 300 nm.

In some preferred embodiments, the polarizing element can be employed in an exposure apparatus used in producing semiconductor devices with minimum feature sizes of 100 nm or below. In some examples, the exposure apparatus uses an excimer laser as a light source, illuminates the light onto a mask pattern through an illumination optical system, and reduces and projects the mask pattern onto a wafer substrate through a projection optical system. Representative light sources are KrF, ArF, and $F_2$ excimer lasers, with wavelengths of, e.g., 248, 193, and 157 nm, respectively. Here, controlling the polarization of the incident light becomes very important, particularly for ArF immersion and $F_2$ lithography.

According to some preferred embodiments of the invention, a filter-type polarizing element can be provided that is suitable for these above-noted wavelengths of light (e.g., less than about 300 nm, or even less than about 250 nm, or even less than about 200 nm, or even less than about 175 nm, or even less than about 160 nm), which can be utilized in the narrow space between a projection lens and a wafer in such a system.

A wire grid polarizer (WGP) is a filter-type polarizer which can potentially control the polarization of deep-UV light (e.g., with a wavelength of 200 nm or less). To be effective for ArF excimer laser light (e.g., 193 nm wavelength) or $F_2$ excimer laser light (e.g., 157 nm wavelength), the thin metal lines should be spaced at an interval of half the wavelength of the incident light or less. Thus, the interval should be smaller than about 100 nm, with even smaller values employed for a better polarization ratio. At the same time, a large area of the substrate should be substantially uniformly covered with such aforementioned wires. Satisfying these two conflicting demands had not been achieved or realized with current photolithography or electron-beam lithography technologies.

The following general considerations have emerged from our efforts in fabricating and testing such WGPs. The polarization layer should be an anisotropic striped structure parallel to the substrate. The striped structure should possess an average interval less than about half of the light wavelength in the transverse direction, and an average continuous distance of about twice the light wavelength or more in the longitudinal direction to generate the necessary conductivity anisotropy. For better polarization performance, the interval should be smaller than about ⅓ of the light wavelength. In addition, it should preferably be larger than about 10 nm; otherwise, it is difficult to form a good reflective thin film. For better polarization performance, the average continuous distance should preferably be more than about 10 times the light wavelength. In addition, it is preferable to be shorter than about 10 microns because greater lengths result that each wire, thus, connects at many places and the polarization performance degrades. The wires should preferably have a thickness (i.e., perpendicular to the substrate) of larger than about 10 nm; otherwise, it is difficult to form a good reflective thin film.

For illustrative purposes, FIG. 1 shows an exemplary wire grid pattern according to some of the preferred embodiments.

In the preferred embodiments, in order to fabricate the periodic fine wire grid, a block copolymer thin film is employed as a template. This method enables the fabrication of patterns with periods finer than 100 nm, which conventional photolithography or electron-beam lithography could not achieve.

In some embodiments, a diblock copolymer containing an aromatic polymer block and an acrylic polymer block can be used because these two polymers have a large difference in their reactive ion etching (RIE) rates. See U.S. Pat. No. 6,565, 763, the entire disclosure of which is incorporated herein by reference. Examples of aromatic polymers include polystyrene, poly(vinyl naphthalene), poly(hydroxystyrene), and their derivatives and statistical copolymers. Examples of acrylic polymers include poly(alkylmethacrylate)s and poly (alkylacrylate)s such as poly(methylmethacrylate), poly(methylacrylate), poly(ethylmethacrylate), poly(ethylacrylate), poly(butylmethacrylate), poly(butylacrylate), poly(hexylmethacrylate), poly(hexylacrylate), poly(phenylmethacrylate), poly(phenylacrylate), poly(cyclohexylmethacrylate), poly(cyclohexylacrylate), and their derivatives and statistical copolymers. Among these polymers, polystyrene and poly(n-hexylmethacrylate) are particularly suitable as choices for the two blocks because polystyrene-poly(n-hexylmethacrylate) diblock copolymer thin films can be easily oriented at moderate temperatures, as is demonstrated herein.

Where one of the blocks of a diblock copolymer can be selectively stained by a metal such as osmium or ruthenium, such a diblock copolymer can also be used as a template in this invention. After one block of the diblock copolymer is selectively stained, the other block can be preferentially removed by reactive ion etching, since the metal-stained block serves as an etch mask. See U.S. Pat. No. 5,948,470, the entire disclosure of which is incorporated herein by reference. Some examples of diblock copolymers which can be selectively stained include polystyrene-polybutadiene, polystyrene-polyisoprene, and polystyrene-poly(ethylene-alt-propylene). For use as the template in this invention, the blocks should be sufficiently long that they self-assemble into nanoscale domains, thus forming a periodic array of domains with a period dictated by the lengths of the blocks. For purposes of the preferred embodiments of the invention, suitable morphologies for the nanoscale domains would include cylinders or lamellae whose domain interfaces lie substantially perpendicular to the substrate.

The self-assembled block copolymer does not spontaneously adopt the highly oriented arrangement of the microdomains which is desired for the template used in polarizer fabrication. The size of the oriented grains in such films may be increased by annealing above the block copolymer's glass transition temperature, but previous studies have shown that the grain size grows with a ¼th power of the annealing time. See C. Harrison, et. al., Physical Review E, 66, 011706 (2002), the entire disclosure of which is incorporated herein by reference. Though grains a few microns across may be achieved in a matter of hours, an extremely long time (e.g., millions or billions of years) would be required to increase the grain size to centimeters, the characteristic size which is necessary for fabricating polarizers useful in, e.g., exposure apparatuses for commercial-scale deep-UV lithography.

In the preferred embodiments, to impart long-range order to the block copolymer thin film template, a shear alignment method can be employed. For example, a rubber pad can be applied to the free surface of a supported block copolymer film, and a shear stress can then be applied to the block copolymer film through the rubber pad as the assembly is annealed above the block copolymer's glass transition temperature. Optionally, the rubber pad can be replaced by a fluid sheared or flowed across the block copolymer film's surface.

Notably, the present inventors discovered that, e.g., block copolymers containing cylindrical nanodomains with a periodicity of about 55 nm can be aligned over several cm by imposing simple shear for just about 1 hour. This striped pattern is transferred to the substrate as described further below. Then, a reflective thin layer is deposited, which acts as the light polarization layer.

Figure 2:
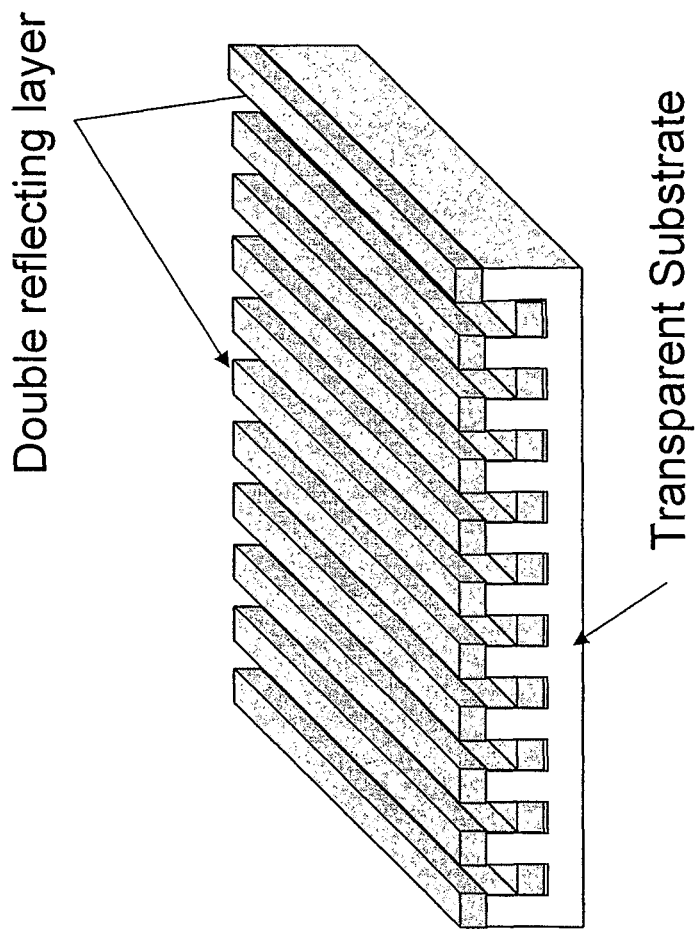
FIG. 2 shows an exemplary wire grid pattern polarizing element having a double reflecting layer according to some of the preferred embodiments.

The present inventors also discovered that a double-layer structure is more efficient in its light polarization and can even be more easily produced. According to some aspects of the present invention, a double-layer wire grid (or a two or more multi-layer wire grid) is employed to polarize the light, with two interdigitated but not interconnected arrays of metal wires supported on a transparent substrate, such as, e.g., a fused silica or a similar material; a schematic is shown in FIG. 2. Preferably, the two wire grids are oriented substantially parallel to each other, and the distance between two layers (i.e., normal to the substrate) is smaller than the wavelength of the light, so that the two layers function as a single grid having half the periodicity of the individual layers. In this manner, the presence of the two wire arrays greatly increases the polarization efficiency over that achieved with only a single wire array.

As described further below, the fabrication process for a double-layer polarizer according to some of the preferred embodiments, involve non-obvious additional processing steps over that required for a single-layer polarizer. In preferred embodiments, the distance between the two layers (i.e., in a direction normal to the substrate) should be smaller than a wavelength of the light for the double layer effect. In addition, it is preferably smaller than about ⅔ of the wavelength of the light because the double periodicity effect is, thus, more apparent. Nevertheless, in preferred embodiments, the distance between the two layers should be larger than about 20 nm in order to help to ensure electrical isolation between the two layers.

In the preferred embodiments, the material from which the wire grid is formed should have a higher plasma frequency than the frequency of the light, $\omega$. In some preferred examples, aluminum, silicon, and/or beryllium can be used due to their exceptionally high conductivity (and, thus, reflectivity) at visible and UV radiation frequencies, resulting from their high plasma frequencies, $\omega_p$. At high frequencies, when $\omega \gg \gamma_0$, where $\gamma_0$ is the highest damping frequency of the metal's dipoles, its dielectric function can be approximated by:

$$\varepsilon(\omega) \approx \varepsilon_b(\omega) - \frac{\omega_p^2}{\omega^2} \tag{1}$$

Where $\omega_p^2 = \rho_e e^2/m^* \varepsilon_0$ is the plasma frequency of the conduction electrons, and $\rho_e$ is the free electron density, e the electron charge, $m^*$ its effective mass and $\varepsilon_0$ is the permittivity of vacuum. The first part of equation (1), $\varepsilon_b(\omega)$ is the contribution from all the dipoles in the metal, which is very nearly equal to 1, and the second part of the equation is the contribution from the conduction electrons. Here, the definition of $\varepsilon$ is $\vec{D} = \varepsilon \varepsilon_0 \vec{E}$, and $\varepsilon$ is always implicitly assumed to vary with frequency, but its explicit dependence will be omitted in the following discussion for simplicity. The dielectric function can also be expressed in terms of the complex index of refraction, which also varies with the frequency:

$$\varepsilon = \tilde{N}^2 = n^2 - k^2 + i2nk \tag{2}$$

where n and k are the real and imaginary parts of the complex index of refraction $\tilde{N}$, also frequency dependent. Now, the reflectivity R of light at normal incidence upon a material in air is given by:

$$R = \left|\frac{(1-n)^2 + k^2}{(1+n)^2 + k^2}\right| \tag{3}$$

Therefore, when the dielectric function is large and negative ($\omega_p/\omega \gg 1$ in equation 1), then from equation (2) we have $k \gg n$, which implies that R is approximately 1 (from equation 3) and the material is, thus, a nearly-perfect reflector. However, when $\omega$ approaches $\omega_p$ and, thus, $\varepsilon$ approaches zero, R drops below unity. This effect is referred to as the "UV transparency of metals." This occurs for most metals at frequencies in the UV region.

By way of example, aluminum has a high plasma frequency ($\eta\omega_p \approx 15$-15.3 eV) leading to R>0.9 even at 12.5 eV energy (at a light wavelength of approximately 99 nm), making it a suitable candidate for an ultraviolet WGP. Other useful materials are beryllium ($\eta\omega_p \approx 18.2$-19 eV) and silicon ($\eta\omega_p \approx 16$ eV). The polarizing ability of such a wire grid can be understood by considering the limit where the period of the grid is much shorter than the light wavelength, in which case it can be treated as an effective material having a uniform thickness, but with an anisotropic dielectric function.

Figure 3:
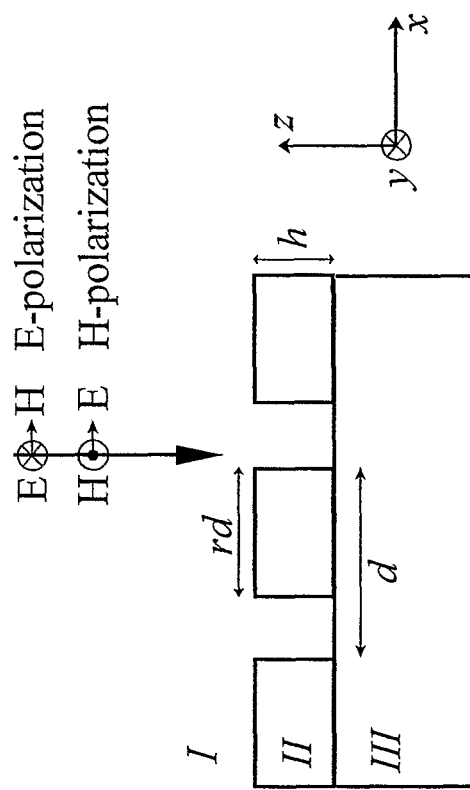
FIG. 3 shows an illustrative grid and two orthogonal polarization components, E and H.

For reference, FIG. 3 shows an illustrative grid and two orthogonal polarization components, E and H. With a fine grid made of a perfect metal (e.g., a perfect conductor at the frequency of interest), we would expect the E-polarization to be completely reflected and the H-polarization to be transmitted. Here, an electromagnetic wave in regions I or III is described by:

$$\psi_{I \text{ or } III} = A\exp(\pm ik_0 \tilde{N}_{I \text{ or } III} z) \tag{4}$$

with the sign appropriate for the direction of propagation. In addition, the wave function in region II may be approximated by the same form:

$$\psi_{II} \approx E\exp(\pm ik_0 \tilde{N}_{avg} z) \tag{5}$$

Because the metal lines in region II are not perfectly conducting, a solution always exists having constant amplitude in the x-direction shown in FIG. 3. Accordingly, in the region II, the wave is an average of:

$$\psi_{metal} \approx E_{metal}\exp(\pm ik_0 \tilde{N}_{avg} z) \text{ and } \psi_{air} \approx E_{air}\exp(\pm ik_0 \tilde{N}_{avg} z) \tag{6}$$

The average wave function carries the same energy density as the average of the waves in air and in the metal. In this regard, the energy density carried by an electromagnetic wave is given by:

$$U = \frac{1}{2}\left(\varepsilon_0 \varepsilon E^2 + \frac{1}{\mu_0} B^2\right) \tag{7}$$
$$= \varepsilon_0 \varepsilon E^2$$

so that:

$$U_{avg} = \varepsilon_0 \varepsilon E_{avg}^2 = rU_{metal} + (1-r)U_{air} = r\varepsilon_0 \varepsilon_{metal} E_{metal}^2 + (1-r)\varepsilon_0 \varepsilon_{air} E_{air}^2 \tag{8}$$

For E-polarization, with the electric field parallel to the metal grid, the boundary condition is:

$$E_{metal} = E_{air} = E_{avg} \tag{9}$$

as the electric field is parallel to the surface. Therefore, the average energy is given by:

$$U_{avgE\text{-}pol} = \varepsilon_0 \varepsilon_{avg} E_{avg}^2 = \varepsilon_0 E_{avg}^2 (r\varepsilon_{metal} + (1-r)\varepsilon_{air}) \tag{10}$$

and the index of refraction of the average medium is found from:

$$(\tilde{N}_{avgE\text{-}pol})^2 = r\tilde{N}_{metal}^2 + (1-r)\tilde{N}_{air}^2 \tag{11}$$

Since $\varepsilon_{air}$ is nearly equal to 1, $\varepsilon_{metal}$ dominates equation (10) at long wavelengths, far from the metal's plasma frequency. Hence, $(N_{avgE\text{-}pol})^2$ becomes negative, so the grid is highly conductive and it is not transparent to E-polarized light.

Following the same idea, the boundary condition for H-polarization, where the electric field is perpendicular to the metal grid, and the average energy are given by:

$$\varepsilon_{metal}E_{metal} = \varepsilon_{air}E_{air} \quad (12)$$
$$= \varepsilon_{avg}E_{avg}$$

$$U_{avg\,H\text{-}pol}{}^n = \varepsilon_0\varepsilon_{avg}E_{avg}^2 \quad (13)$$
$$= \varepsilon_0\varepsilon_{avg}^2 E_{avg}^2 \left(\frac{r}{\varepsilon_{metal}} + \frac{1-r}{\varepsilon_{air}}\right)$$

The expression for $\tilde{N}_{avg}$ for H-polarization is therefore given by:

$$\frac{1}{(\tilde{N}_{avg\,H\text{-}pol}{}^n)^2} = \frac{r}{\tilde{N}_{metal}^2} + \frac{1-r}{\tilde{N}_{air}^2} \quad (14)$$

$(N^{\%}{}_{avgE\text{-}pol}{}^n)^2$ is positive at long wavelengths, so the grid can transmit H-polarized light.

In general, the polarization efficiency is given by:

$$P = \frac{I_\| - I_\perp}{I_\| + I_\perp} \quad (15)$$

where $I_\|$ is the intensity in the direction parallel to the filter's polarization axis and $I_\perp$ is the intensity in the orthogonal direction. The polarization efficiency P was calculated as a function of reduced wavelength $$\frac{\omega_p}{\omega}$$

using equation (1) with $\in_b=1$ for the dielectric function of the metal grid. The wire thickness h (i.e., in a direction perpendicular to the substrate) is expressed in units of the skin depth at the zero frequency limit $\xi_0=\lambda/4\pi k$, where the skin depth is defined as the thickness necessary to attenuate the wave by a factor of e and is typically a few tens of nanometers for a good metal. The fraction of the substrate covered by metal r (shown in FIG. 3) was set to 0.5 for this example calculation. A freestanding grid is considered for simplicity, so that $\in_{substrate}=1$. However, since the dielectric function of the metal is much larger than that of any transparent glass substrate, the difference in polarization efficiency between a freestanding grid and a grid supported on a glass substrate is small.

Figure 4A:
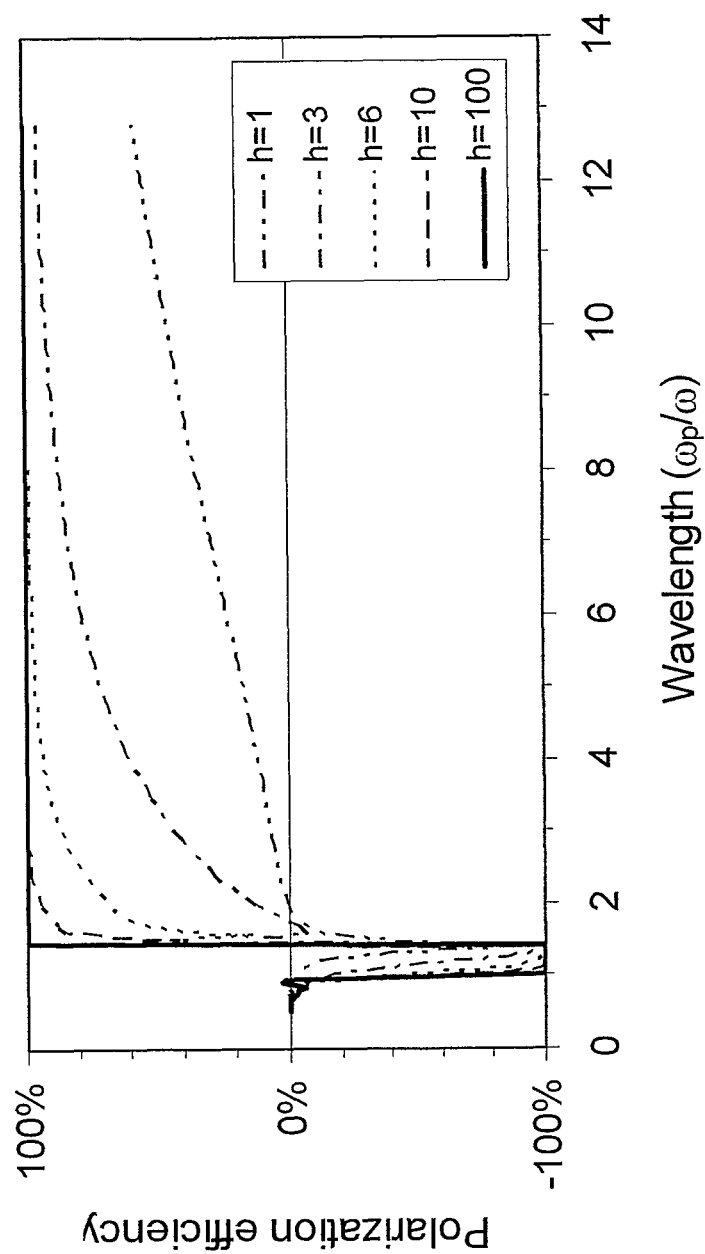
FIG. 4(A) is an illustrative chart depicting polarization efficiency to wavelength for various values of h according to some illustrative embodiments.

At wavelengths much longer than that corresponding to the plasma frequency $$\left(\frac{\omega_p}{\omega} > 1.5\right),$$

the polarization efficiency P>0, and for thicker grids (e.g., with a value of h greater than or equal to about 10 as depicted in FIG. 4(A)), P is nearly 1. Notably, the calculations in FIG. 4(A) predict that for $$\frac{\omega_p}{\omega}$$

between 1 and 1.4, P is large but negative, indicating that E-polarized light should be transmitted more than H-polarized light as the frequency of the light ω approaches the plasma frequency $\omega_p$. This may be understood as follows. As long as the material is metallic ($\in$<0), it is highly reflective, but the reflectivity R drops sharply as $\in$ approaches zero from below (ω approaches $\omega_p$ from below) as the material becomes transparent. However, equation (11) shows that $\omega_{p\,avg}{}^E = \omega_{p\,metal}/\sqrt{1/r}$. Furthermore, from equation (14):

$$\varepsilon_{avg}^H = \frac{2\varepsilon_{metal}\varepsilon_{air}}{\varepsilon_{metal} + \varepsilon_{air}} \quad (16)$$
$$= \frac{\varepsilon_{metal}\varepsilon_{air}}{\varepsilon_{avg}^E}$$

which shows that when $\in_{avg}{}^E<0$, $\in_{avg}{}^H>0$, so the grid transmits H-polarized radiation. When $\in_{avg}{}^E$ goes from negative to positive at $\omega=\omega_{p\,metal}/\sqrt{1/r}$, $\in_{avg}{}^H$ becomes negative, and the polarizing behavior is reversed from that observed at long wavelengths. These calculations, thus, reveal that WGP should be effective at polarizing light with frequencies ω as high as $\omega_p$, though for $1<\omega_p/\omega<\sqrt{1/r}$, the grid must be rotated by 90 degrees from its long-wavelength (high $\omega_p/\omega$) orientation to achieve the same polarization direction for the transmitted light. So, light polarization by a WGP is possible provided the metal used to form the wires has a higher plasma frequency than the frequency of the light of interest.

This region shows quite interesting features. The polarization angle is 90 degrees rotated to the conventional. This phenomenon becomes notable in deep UV region of under 200 nm wavelength WGPs, and this is completely opposite phenomena from the polarizing direction of WGPs at infra red (IR) and visible light regions. A deposited aluminum film theoretically reflects the deep UV light, but it contains a certain amount of alumina (aluminum oxide) and, thus, gives a lower reflection ratio in the deep UV than in theory. It also pushes the plasma frequency to a lower frequency (i.e., to a longer wavelength). Moreover, the polarization efficiency of the WGP is not as good as may be expected.

Data obtained by the present inventors shows that the plasma frequency and the crossover frequency are adjustable by controlling deposition conditions. In this regard, as depicted in FIG. 4(A), there is a region in which the polarization efficiency is negative enough to polarize the deep UV light between the plasma frequency and the crossover frequency. By way of example, Example 1 described below uses such a phenomena to polarize 193 nm wavelength light using deposited aluminum.

Figure 4B:
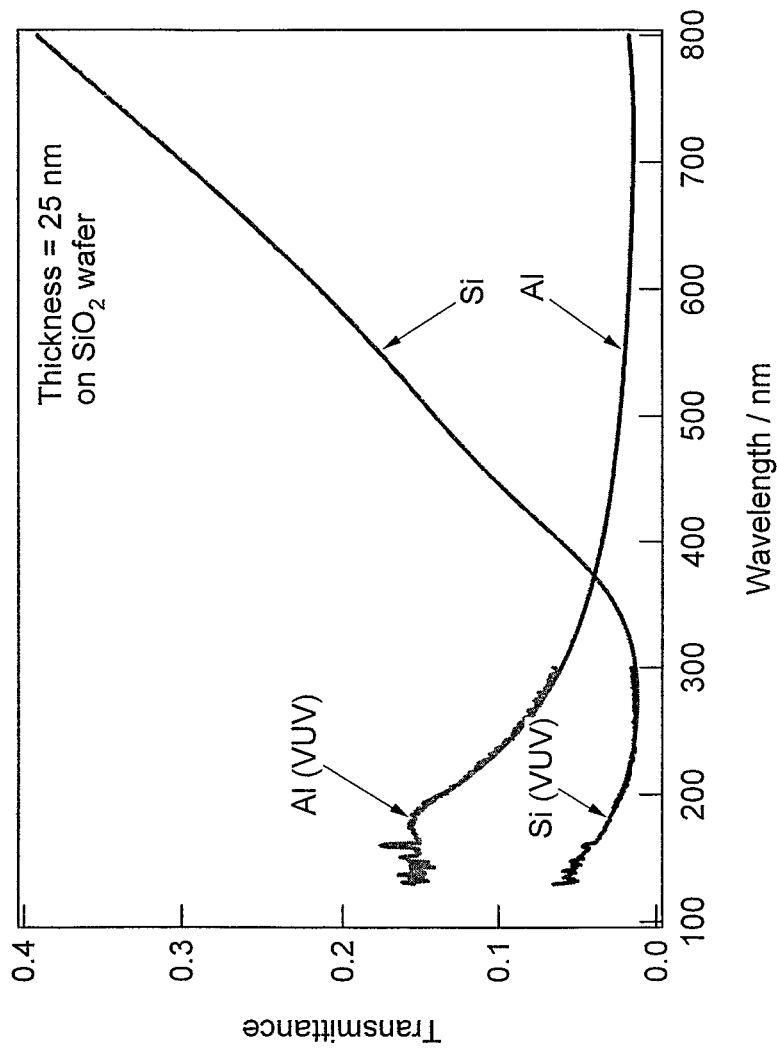
FIG. 4(B) is an illustrative chart depicting transmittance to wavelength for comparison purposes of Al and Si according to some illustrative embodiments.

The present inventors have also discovered that silicon has a better performance than aluminum in the deep UV region. In this regard, FIG. 4(B) shows the transmittance of light from 130 nm to 800 nm according to some illustrative examples. In these examples, the sputtering condition before introducing gas was $10^{-5}$ Pa and during sputtering for Al (gas pressure 0.13 Pa; gas flow 25 sccm, DC300W; 38.0 s; 25 nm) and for Si (gas pressure 0.13 Pa; gas flow 25 sccm; DC300W; 60.3 s; 25 nm). As shown in this example, silicon reflectivity was higher than that of aluminum at our target wavelengths (including, e.g., 157, 193 and 248 nm wavelengths). As shown in this illustrative example, using silicon as a polarizing layer was, thus, better than using conventional aluminum film.

Nevertheless, it is difficult to make a polarizer for small wavelengths, such as, e.g., the 157 nm wavelength. Accordingly, for such wavelengths both the silicon-polarizing layer and the adjusting plasma frequency features described herein are preferably employed.

The polarizing element is manufactured by using a self-assembling block copolymer thin film as a mask, as this avoids the limitations of conventional lithography. In addition, further non-obvious steps were employed to effectively manufacture WGPs via block copolymer lithography. In particular, block copolymer films do not spontaneously adopt long-range order of their microdomains, so this orientation was imparted to the film separately. Furthermore, block copolymers are organic materials and are, thus, difficult to use directly in the fabrication of thin metal lines.

In addressing these problems, the present inventors developed new methods for fabricating the polarizing element. A detailed description of these new methods of manufacture will now be described with reference to FIG. 5

On the transparent substrate 100, an organic polymer layer 110 is spin-coated as to a thickness of about 50-150 nm, if required. In this regard, amorphous quartz ($SiO_2$), fluorine-doped amorphous quartz, fused silica, or artificial fluorite ($CaF_2$) are examples of materials suitable for the transparent substrate. For shorter-wavelength ultraviolet light below 200 nm, especially, e.g., at 157 nm, artificial fluorite or fluorine-doped amorphous quartz are desirable substrates. The organic polymer 110 is used as a mask for substrate etching to enhance the aspect ratio of pattern on the substrate. To accomplish this, it should have high etching durability and a high glass transition temperature, greater than 150° C., and should be easily removed by a liquid remover, sonication, ashing and/or oxygen plasma etching. Poly(hydroxystyrene), novolac resin, polyimide and derivatives, and cycloolefin polymers and copolymers are examples of suitable organic polymers.

Next, an inorganic substance 120 is spin-coated or deposited on top of the organic polymer film 110 to a thickness of 5 to 30 nm, as required. This inorganic layer serves as an etch mask for patterning the organic layer 110 below, through oxygen plasma etching. The organic layer 110 is easily etched by oxygen plasma, while suitable inorganic layers 120 should have a high resistance to oxygen plasma etching. If no organic layer was previously applied, this inorganic layer serves directly as the mask for etching the substrate. In this case, the inorganic layer 120 should have a high resistance to etching by $SF_6/H_2$ or $CF_4/H_2$ plasma. Deposited silicon, silicon nitride, and silicon oxide are examples of suitable materials for the inorganic layer 120. Spin-coated siloxane polymer, polysilane, and spin-on glass are also suitable materials for the inorganic layer when oxygen plasma etching is employed.

Finally, a block copolymer thin film 130 is spin-coated on top of the inorganic layer 120. In some embodiments, diblock copolymers can be used, which comprise two different homopolymer blocks (denoted A and B below) connected end-to-end by a chemical bond, and that form self-assembled domains of the chemically different blocks. The two dissimilar blocks tend to separate from each other, but the chemical bond restricts the length scale of phase separation to the molecular size, producing nanometer-scale domains. Triblock and multiblock copolymers, star or starblock copolymers, and graft copolymers show similar behavior and can also be employed as masks in some embodiments of the present invention. Notably, the means by which the different blocks are connected does not fundamentally alter the self-assembly process. The nanoscale domains in a block copolymer can adopt various morphologies according to the volume fraction of the two blocks (e.g., A and B blocks).

It is notable, however, that these nanodomains do not spontaneously develop long-range order or alignment. To overcome this problem, shear alignment can be employed on a block copolymer film containing a single layer of cylindrical nanodomains. See D. E. Angelescu, et al. Advanced Materials, vol. 16, No. 19, pp. 1736 Oct. 14, 2004, the entire disclosure of which is incorporated herein by reference. With this simple and robust method, cylindrical block copolymer microdomains can be aligned over regions measuring, for example, several square centimeters. However, the polystyrene-poly(ethylene-alt-propylene) diblock copolymers on which shear alignment has previously been demonstrated in D. E. Angelescu, et al. Advanced Materials, vol. 16, No. 19, Oct. 14, 2004 do not show any significant etch contrast in reactive ion etching (RIE). Thus, it was not workable to transfer the aligned pattern into metal layers. Accordingly, the present inventors developed an alternative pattern transfer method for manufacturing polarizers, as described further below.

Illustrative Polarizer Fabrication Methods

After the diblock copolymer film was deposited by spin coating, it was annealed (e.g., on a hotplate or in an oven) to evaporate the solvent, if necessary. Then, with reference to FIG. 4(C), a pad 220 was applied to the film and a weight 230 applied to the pad in order to keep the film and rubber pad in intimate contact together. In some embodiments, the pad 220 is a rubber pad. In this regard, silicon rubbers such as polydimethylsiloxane (PDMS) are favorable because of their high temperature durability, but other types of rubber such as cross-linked natural rubber, polyisoprene, polybutadiene, butyl rubber, ethylene-propylene copolymer rubber, styrene-butadiene copolymer rubber and other appropriate materials can be used for the pad. Then, a force F was applied to the pad in a direction parallel to the film-pad interface as shown in FIG. 4(C) in order to shear the film. In this regard, the shear should preferably be applied at a temperature above the glass transition temperature of the block copolymer. In preferred embodiments, the displacement of the pad at the film-pad interface should be greater than about 10 microns and less than about 5 mm. Otherwise, the pattern can be poorly aligned or can become non-uniform over large areas. Optionally, instead of using such a rubber pad, shear can also be applied by shearing or flowing a non-solvent liquid such as silicon oil deposited on the surface of the block copolymer film.

Once the block copolymer is aligned, if one of the polymers can be removed more easily than the other by etching, the oriented nanoscale domains of the copolymer which remain can be used as an etching mask. Diblock copolymers containing aromatic and acrylic blocks show a large contrast in the etching rates of the two blocks and are, thus, suitable. For example, a polystyrene-poly(n-hexylmethacrylate) diblock copolymer shows good alignment under a suitable applied shear stress, and the two blocks show a large etch rate difference under RIE, leaving the aligned polystyrene domains to act as an etch mask for a striped pattern.

Some block copolymers, such as polystyrene-polyisoprene, polystyrene-polybutadiene, and polystyrene-poly(ethylene-alt-propylene) diblock copolymers, do not show a substantial RIE etch rate difference between the blocks. In such cases, staining one of the blocks can effectively enhance the etch rate contrast, since the stain (which can involve, e.g., a heavy metal) can impart higher etching durability where it is present. By way of example, polyisoprene and polybutadiene are stainable by osmium tetraoxide while polystyrene is not, and the etch rate contrast after staining is sufficient to allow the block copolymer pattern to be transferred to the substrate. See M. Park, et al., Science, vol. 276, 1401 (1997), the entire disclosure of which is incorporated herein by reference. As another example, ruthenium tetraoxide can be used to stain polystyrene while not staining poly(ethylene-alt-propylene).

Figure 5:
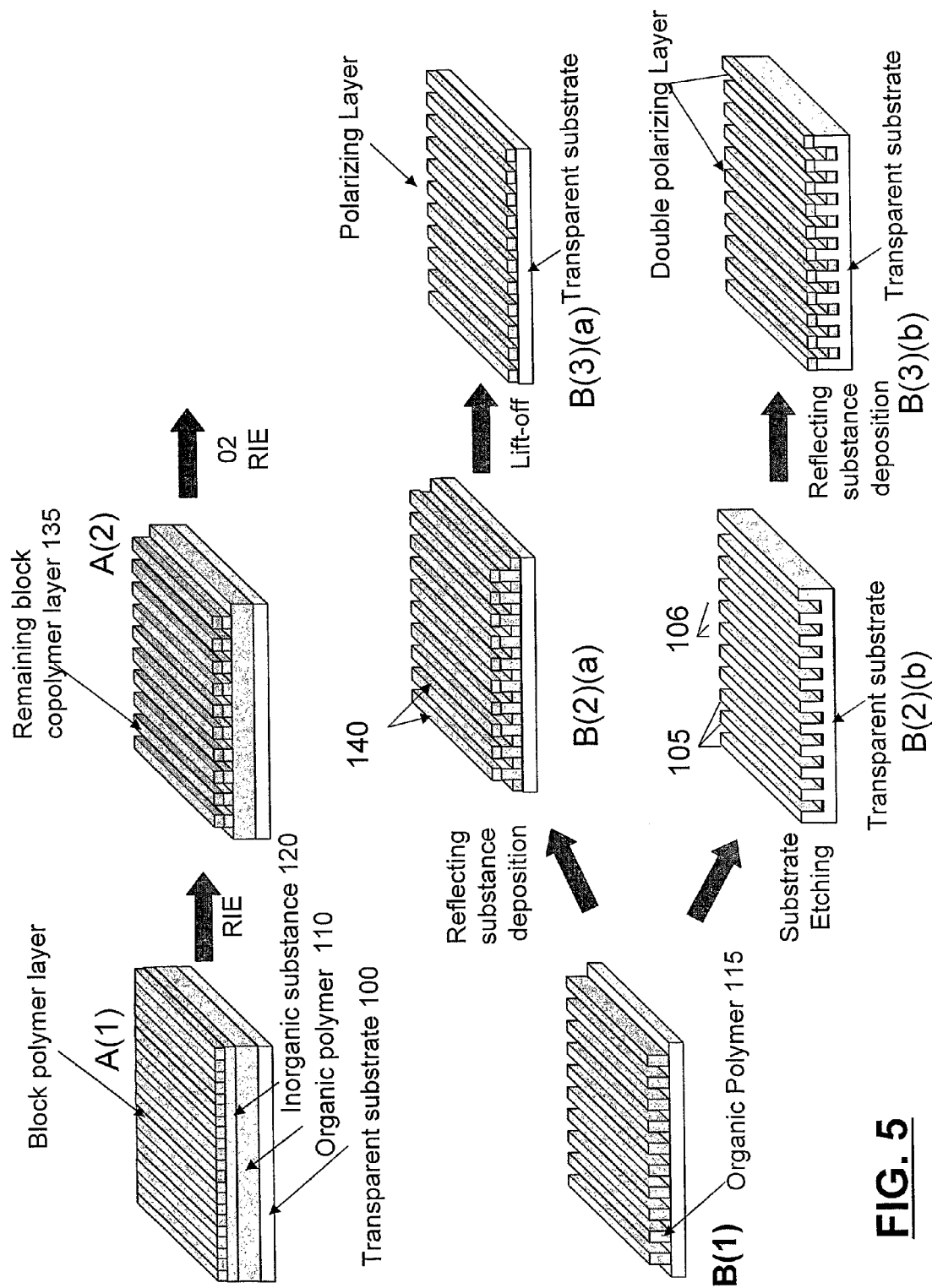
FIG. 5 is a flow diagram depicting various states within methods for fabricating polarizing elements according to some embodiments of the present invention.

As shown at position A(2) in FIG. 5, after the block copolymer is selectively etched to yield a striped pattern 135, the glass substrate or metal film can be etched using the striped pattern as an etch mask. However, the polymers which are typically incorporated into block copolymers are not durable enough to resist the etching conditions required to etch a hard substrate or a metal layer. To circumvent this difficulty, a further pattern transfer step employing an inorganic layer is preferably employed to enhance the aspect ratio of the features in the mask.

Significant changes in the etch rate ratio between organic substances (including polymers) and inorganic substances can be achieved by choosing different etching gases. If the materials and etch conditions are properly chosen, the very thin mask formed by the etched block copolymer can be enhanced significantly. See U.S. Pat. No. 6,565,763 and M. Park, et al., Applied Physics Letters, vol. 79, 257 (2001), the entire disclosures of which are incorporated herein by reference. In preferred embodiments, the inorganic substance should have high resistance to oxygen plasma etching but be relatively easily etched by fluorine-containing gases. Deposited silicon, silicon nitride, and silicon oxide can be used for this inorganic substance layer, with $SF_6$ gas used for silicon etching and $CF_4/H_2$ gas used for silicon nitride etching. Spin-coated siloxane polymer, polysilane, and spin-on glass can also be used for the inorganic substance, with $CF_4$ gas used for etching. In these examples, the inorganic layer is not etched by oxygen plasma, making the etch contrast between the inorganic layer and the underlying polymer very large so that the polymer layer is rapidly etched and a high aspect ratio striped pattern can be obtained. Poly(hydroxystyrene), novolac resin, polyimide and derivatives, and cycloolefin polymers and copolymers are examples of suitable organic polymers.

After the striped pattern is transferred into the organic polymer layer (see pattern 115 at position B(1) in FIG. 5), the polarization layer is deposited (see layer 140 at position B(2)(a) in FIG. 5). As described above, the material for the polarization layer should have a higher plasma frequency than the frequency of the light which it is intended to polarize. In some preferred embodiments, suitable materials for the polarization layer 140 include aluminum, silicon, and/or beryllium. In some cases, the materials employed for the polarization layer can be allowed to contain some contaminants, such as, e.g., oxygen, nitrogen and/or water, as long as the material's effective plasma frequency is higher than the frequency of the light which it is intended to polarize. As shown at position B(3)(a) in FIG. 5, the polymer is removed after the deposition and the structure of the polarizer of the first aspect of the present invention is completed.

Alternatively, another fabrication method can be employed in which a multi-layer, e.g., a double-layer, grid is formed. For example, as shown at the bottom of FIG. 5 at positions B(2)(b) and B(3)(b), a double-layer wire grid, which acts as a single-layer grid with half the periodicity of the individual layers, can be fabricated using the following methodology. After the striped pattern is transferred to the organic polymer layer at position B(1) shown in FIG. 5, the transparent substrate 100 can be etched by RIE using the organic polymer layer 110 as a mask, to produce a pattern of ridges 105 and trenches 106 in the substrate with a periodicity and depth of, e.g., tens of nanometers. Onto this patterned substrate 105, the polarization layer can be directly deposited. At this point, in some preferred embodiments, the structure of the polarizer in this embodiment of the present invention is completed. Here, exemplary materials of the polarization layer 140 that are employed can be the same as for the above-described embodiments.

Illustrative Polarizer Applications and Uses

Polarizers fabricated according to the preferred embodiments of the present invention can be employed within a wide range of applications and uses. By way of example, polarizers according to the preferred embodiments of the present invention can be employed within semiconductor exposure apparatuses and have particular advantages in such applications.

Figure 6:
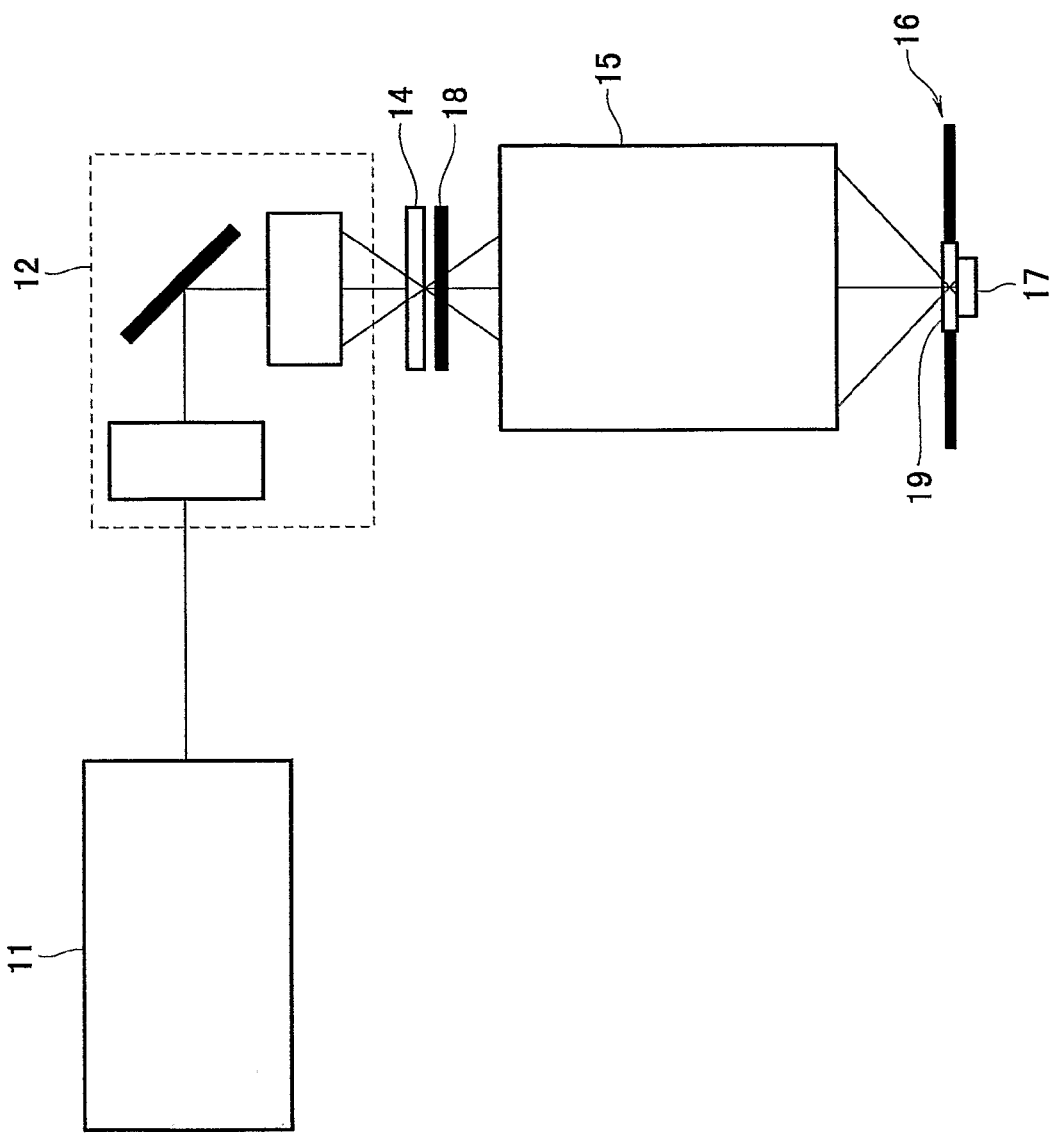
FIG. 6 schematically shows an exemplary semiconductor exposure apparatus within which polarizers according to the preferred embodiments of the present invention can be employed.

By way of example, FIG. 6 schematically shows an exemplary semiconductor exposure apparatus within which polarizers according to the preferred embodiments of the present invention can be employed. As shown, an excimer laser device 11 emits excimer-laser light, which enters the illumination optical system 12 before illuminating a mask 14. The illumination optical system 12 adjusts the shape and intensity distribution of the illuminating light. After passing through the mask 14, the excimer-laser light enters the projection optical system 15, which refocuses the light. The excimer-laser light then reaches the wafer substrate 16, thereby reducing and transferring the pattern present on the mask 14 onto the wafer substrate 16.

In some applications employing polarizers according to some of the preferred embodiments of the invention, the polarization-conversion characteristics of the illumination optical system 12 can be evaluated by locating a polarizing element 18 according to an embodiment of this invention directly above or below the mask 14 (note: FIG. 6 illustrates the polarizer 18 located directly below the mask 14), and by measuring the intensity of the transmitted light with the detector 17 located downstream of the polarizing element. In the example shown in FIG. 6, the detector 17 is located near the imaging plane.

Preferably, after rotating the polarizing element 18 (e.g., 90 degrees), a similar measurement is performed. The relation between the orientation of polarizing element 18 and the intensity measured by the detector 17 enables the evaluation of the polarization-conversion characteristics.

In some other applications employing polarizers according to some of the preferred embodiments of the invention, the polarization-conversion characteristics of the projection optical system 15 can be evaluated by locating a polarizing element 19 according to an embodiment of this invention near the position of the wafer substrate 16, and by performing similar measurements as described above. As described above, the relation between the orientation of polarizing element 19 and the intensity measured by the detector 17 permits evaluation of the polarization-conversion characteristics. Optionally, in some embodiments, the detector 17 may be replaced by a wafer substrate coated with a photosensitive layer.

In some cases, the foregoing evaluations can be used as bases for implementing adjustments to the illumination optical system 12 and/or the projection optical system 15 of the exposure apparatus.

Thereafter, once properly adjusted, the exposure apparatus can be used to successfully manufacture semiconductor devices by exposing a wafer substrate 16 with a projected pattern, defined by the mask 14, having high image contrast.

While a number of applications and uses are described above, it should be appreciated by those in the art based on this disclosure that the novel polarizer elements according to the various embodiments of the invention described herein can be employed within a variety of applications and uses.

By way of example, gold wire grids have been used to polarize infrared for over a hundred years, but they are not good for shorter wavelengths due to their large period. With embodiments of the present invention grids with periods a few tens of nanometers can be fabricated. Among other things, such grids can be used to polarize visible and even ultraviolet light. As a result, such WGPs have a wide variety of applications and uses, and can, e.g., be used in, among other applications:

Fabrication of semiconductors;
Nanolithography;
Astrophysics (e.g., analyzing UV radiation with satellites); and
Analyzer at synchrotron sources.

EXAMPLES

Example 1

Polyimide (Durimide™ 285, Arch Chemicals, Inc., diluted to 3 wt % in gamma-butyrolactone) was spin coated at 1500 rpm for 45 seconds onto a 4-inch-diameter amorphous quartz wafer (AQ: Asahi Glass Co., Ltd.) to form an organic polymer layer. The resulting film, 100 nm thick, was then heated at 90° C. for 30 minutes, and at 150° C. for another 30 minutes, to evaporate residual solvent and crosslink the polymer.

Next, silicon nitride was deposited using plasma-enhanced chemical vapor deposition. The deposition was performed at 150 sccm of $N_2$, 110 sccm of $SiH_4/N_2$ and 2 sccm of $NH_3$ maintained at 900 mTorr, ignited with 20 W (80 mW/cm$^2$) and lasting 75 seconds, for a final silicon nitride layer thickness of 22 nm. This inorganic substance layer serves an etch barrier in subsequent processing.

Next, a film of polystyrene-poly(n-hexylmethacrylate) diblock copolymer was deposited by spin-coating from a 1 wt % solution in toluene, at 2500 rpm for 45 seconds. The molecular weight of the polystyrene block was 30,000 g/mol and that of the poly(n-hexylmethacrylate) block was 84,000 g/mol, so that the morphology of the film consisted of cylinders of polystyrene in a matrix of poly(n-hexylmethacrylate), with a period of 55 nm. The resulting thickness of the block copolymer film was 45 nm.

A cross-linked polydimethylsiloxane (PDMS) elastomer pad (Sylgard™ 184, Dow Corning Corp.) was used to contact the top surface of the block copolymer film. The pad was pressed against the film with 300 g of force per square centimeter of pad area (30 kPa pressure) using a weight. A shear force was then applied to the PDMS pad at the level of 60 to 100 g per square centimeter of pad area (6 to 10 kPa stress). The stress was applied for 30 minutes at 150° C. Alignment of the block copolymer cylinders was confirmed by atomic force microscopy after shearing and removal of the PDMS pad.

The diblock copolymer was then etched by $CF_4$ RIE, at 2 sccm $H_2$, 8 sccm $CF_4$, 15 mTorr pressure, and 100 W of RF power (0.4 W/cm$^2$) for 40 seconds. In this process, the poly (n-hexylmethacrylate) matrix was removed, and the silicon nitride underneath the block copolymer film was also etched in the regions between, but not underneath, the polystyrene cylinders. The etch conditions were chosen so as to completely etch away the silicon nitride in the regions between the polystyrene cylinders, thus exposing the underlying polyimide layer in those regions. Then, the polyimide layer was etched by $O_2$ RIE using the remaining silicon nitride as an etch mask, to yield a high aspect ratio pattern of ridges located beneath the original locations of the polystyrene cylinders.

Aluminum was then deposited onto the resulting striped pattern using an electron-beam evaporator, for an aluminum film thickness of 40 nm. The polyimide was then removed by immersing the assembly in 1-methyl-2-pyrrolidinone and sonicating, to yield the completed polarizer.

Figure 7:
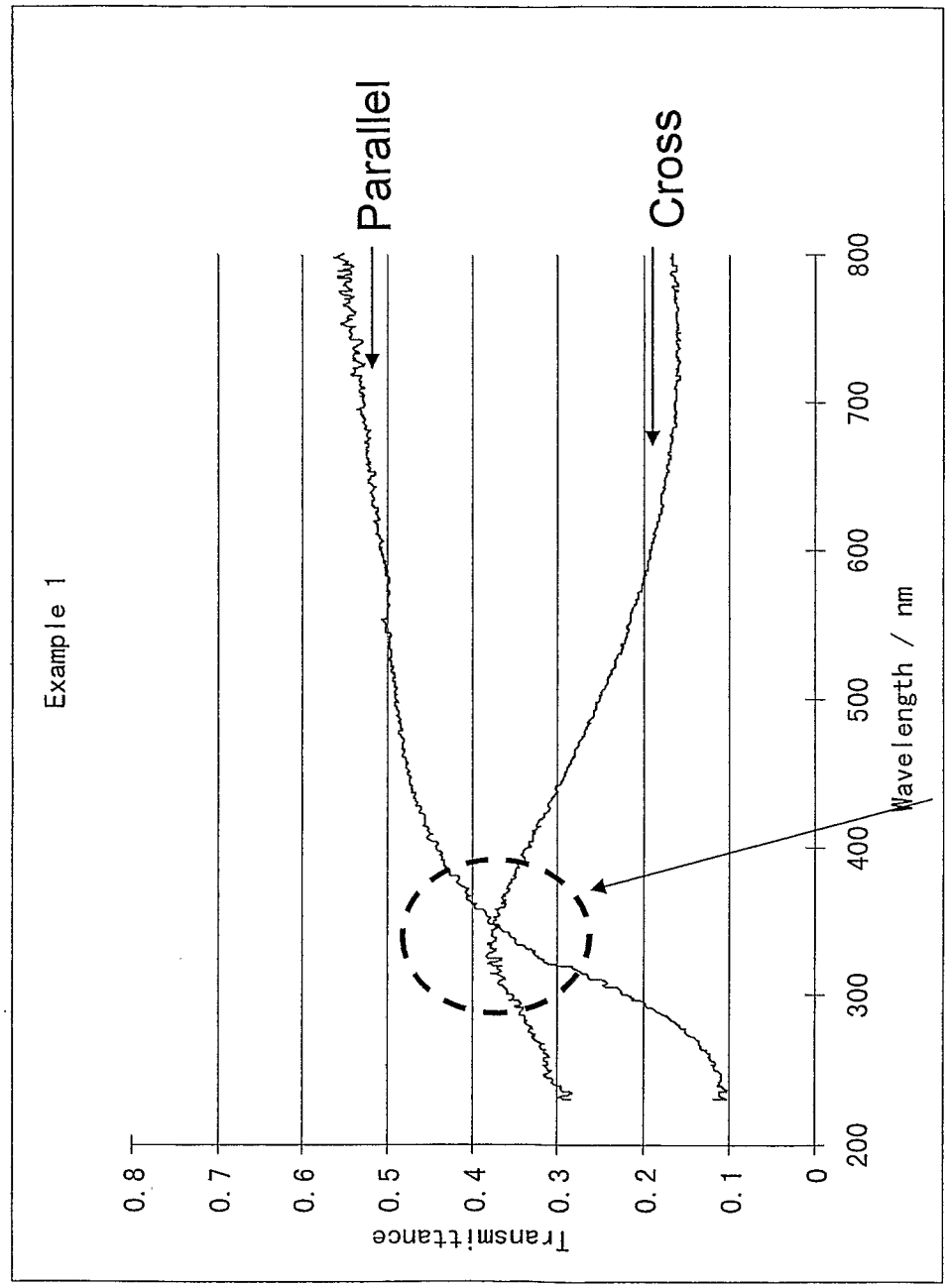
FIG. 7 is a chart showing transmission vs. wavelength characteristics of a polarizer according to some illustrative embodiments.

The polarization efficiency was measured with a UV-visible spectrometer, using a calcite crystal to polarize the incident beam. The transmission vs. wavelength characteristics of the polarizer according to this example oriented at various angles to the polarization direction of the incident light are shown in FIG. 7. It can be observed that the light is polarized over a broad range of wavelengths, extending down at least to the 230 nm limit of the spectrometer. For wavelengths greater than 350 nm, H-polarized light is preferentially transmitted, while below 350 nm, E-polarized light is preferentially transmitted.

Example 2

Double Layer Polarizer

In this example, the same process was done as in Example 1 until after the $O_2$ RIE. Then, the amorphous quartz wafer was etched using $CF_4$ RIE, at 10 sccm, 15 m Torr pressure, and 100 W of RF power (0.4 W/cm$^2$) for 50 seconds. The amorphous quartz was engraved 70 nm as a pattern of ridges located beneath the original locations of the polystyrene cylinders.

All of the organic substances were removed by immersing the assembly in 1-methyl-2-pyrrolidinone and sonicating for three times, and by oxygen plasma ashing.

Aluminum was then deposited onto the resulting striped pattern using an electron-beam evaporator, for an aluminum film thickness of 40 nm, to complete the double layer polarizer.

Example 3

Finer Stripe Pattern Manufactured by Metal Staining Method

In this example, 3 wt % propyleneglycol monomethylether acetate (PGMEA) solution of poly(4-hydroxystyrene) (ALDRICH) was spin coated at 2000 rpm for 45 seconds onto a 4-inch-diameter amorphous quartz wafer to form an organic polymer layer. The resulting film, 80 nm thick, was then heated at 120° C. for 90 seconds to evaporate residual solvent.

Next, silicon was deposited using an electron-beam evaporator and the resulting thickness was 10 nm. Then, a film of polystyrene-poly(ethylene-alt-propylene) diblock copolymer was deposited by spin-coating from a 0.75 wt % solution in toluene, at 2500 rpm for 45 seconds. The molecular weight of the polystyrene block was 5,000 g/mol and that of the poly(ethylene-alt-propylene) block was 13,000 g/mol, so that the morphology of the film involved cylinders of polystyrene in a matrix of poly(ethylene-alt-propylene), with a period of 16 nm. The resulting thickness of the block copolymer film was 24 nm.

A cross-linked polydimethylsiloxane (PDMS) elastomer pad (SYLGARD™ 184, DOW CORNING CORP.) was used to contact the top surface of the block copolymer film. The pad was pressed against the film with 300 g of force per square centimeter of pad area (i.e., 30 kPa pressure) using a weight. A shear force was then applied to the PDMS pad at a level of 60 to 100 g per square centimeter of pad area (i.e., 6 to 10 kPa stress). The stress was applied for 30 minutes at 1250° C. Alignment of the block copolymer cylinders was confirmed by atomic force microscopy after shearing and removal of the PDMS pad.

The surface of the block copolymer was irradiated by UV light from a mercury lamp at 10 mJ/cm$^2$ to make the surface hydrophilic. Then, the sample was exposed to a vapor of 0.5% aqueous solution of ruthenium tetraoxide (Electron Microscopy Sciences) for 2 minutes. As a result, the polystyrene block was stained by ruthenium.

The diblock copolymer was then etched by $SF_6$ RIE, 10 sccm, 15 mTorr pressure, and 75 W of RF power (0.3 W/cm$^2$) for 30 seconds. In this process, the poly(ethylene-alt-propylene) matrix was removed, and the silicon layer underneath the block copolymer film was also etched in the regions between, but not underneath, the stained polystyrene cylinders. Then, the poly(4-hydroxystyrene) layer was etched by $O_2$ RIE using the remaining silicon as an etch mask, to yield a high aspect ratio pattern of ridges located beneath the original locations of the polystyrene cylinders.

Aluminum was then deposited onto the resulting striped pattern using an electron-beam evaporator, for an aluminum film thickness of 30 nm. The poly(4-hydroxystyrene) was then removed by immersing the assembly in alkali developer (2.38% tetramethyl ammonium hydroxide aqueous solution) and sonicating, to yield the completed polarizer.

Example 4

Manufacturing Method Using Nanoimprint for Mass Production

In this example, manufacturing methods using nanoimprint for mass production are described. While some illustrative embodiments are described below, in conjunction with FIG. 8, it is to be understood that details can be varied in other embodiments by those in the art based on this disclosure. With respect to these embodiments, as discussed above, the entire disclosure of the following publication is incorporated herein by reference for background: She-Won Ahn, et al., Nanotechnology, Institute of Physics Publishing, Vol. 16 (2005), pp. 1874-1877. Among other things, that publication describes a fabrication procedure of a WGP using nanoimprint lithography (NIL) and RIE, which includes imprint, demoulding, and pattern transfer steps using RIE, and wherein, before getting into the imprint step, a stamp is fabricated with a desired structure. As expressed in said publication, the fabrication of stamps is an important step for the NIL process and, practically, the resolution of master patterns in stamps determines that of the replicated patterns using NIL.

In the present illustrative embodiments, a polyimide (DURIMIDE™ 285, ARCH CHEMICALS, INC., diluted to 3 wt % in gamma-butyrolactone) was spin coated at 1500 rpm for 45 seconds onto a 6-inch-diameter silicon wafer to form an organic polymer layer. The resulting film, 100 nm thick, was then heated at 90° C. for 30 minutes, and at 150° C. for another 30 minutes, to evaporate residual solvent and crosslink the polymer.

Next, a silicon layer was deposited to the thickness of 13 nm by an e-beam evaporator and a film of polystyrene-poly(n-hexylmethacrylate) diblock copolymer was spin-coated, then shear was applied through a PDMS pad at the same conditions of Example 1.

The sample was exposed to the vapor of 0.5% aqueous solution of ruthenium tetraoxide (Electron Microscopy Sciences) for 2 minutes and the polystyrene block was stained by ruthenium.

The diblock copolymer was then etched by $SF_6$ RIE, 10 sccm, 15 mTorr pressure, and 75 W of RF power (0.3 W/cm$^2$) for 30 seconds. In this process, the poly(n-hexylmethacrylate) matrix was removed, and the silicon layer underneath the block copolymer film was also etched in the regions between, but not underneath, the polystyrene cylinders. The etch conditions were chosen so as to completely etch away the silicon layer in the regions between the polystyrene cylinders, thus exposing the underlying polyimide layer in those regions. Then, the polyimide layer was etched by $O_2$ RIE using the remaining silicon as an etch mask, to yield a high aspect ratio pattern of ridges located beneath the original locations of the polystyrene cylinders.

Figure 8:
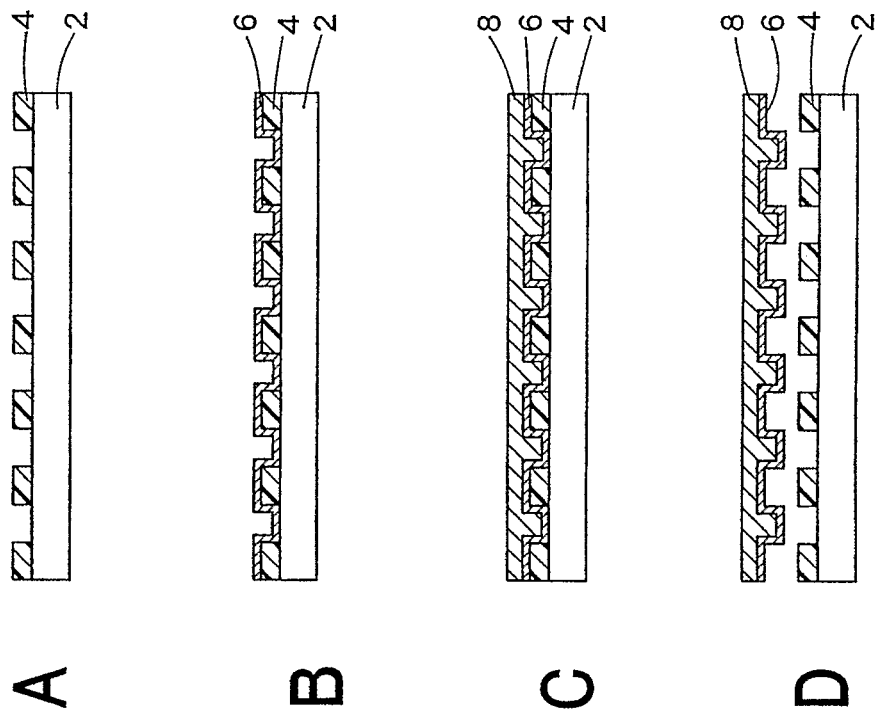
FIG. 8 is a flow diagram depicting various states within methods for manufacturing polarizing elements using nanoimprint for mass production.

With reference to FIG. 8, a nickel electrical conductive film 6 was formed on the resultant striped the polyimide pattern 4 on silicon wafer 2 by a sputtering process. Pure nickel was used as target, and sputtering was conducted for 40 seconds under application of DC power of 400 W within a chamber which was evacuated to $8\times10^{-3}$ Pa and then introduced with argon adjusted to 1 Pa, so that a conductive film with a thickness of 30 nm was obtained (see state B in FIG. 8).

The resist original disk with the conductive film 6 was plated for 90 minutes using nickel (II) sulfamate plating liquid (NS-160 produced by SHOWA KAGAKU CO., LTD) (see state C in FIG. 8). In this regards, the plating bath conditions were as follows:

Nickel sulfamate: 600 g/L;
Boric acid: 40 g/L;
Interfacial active agent (sodium lauryl sulfate): 0.15 g/L;
Liquid temperature: 55° C.;
pH: 4.0;
Current density: 20 A/dm$^2$.

In this regard, the thickness of the plated film 8 was 0.3 mm. Thereafter, as shown at state D in FIG. 8, a stamper 8 provided with the conductive film 6, the plated film 8 and the resist residue was obtained by peeling off the plated film 8 from the striped patterned polyimide wafer.

The polyimide residue was removed by immersing in 1-methyl-2-pyrrolidinone and sonication. The surface of the nickel was treated by oxygen plasma ashing and $CF_4/O_2$ RIE to remove residual silicon and polymer. Thereafter, an imprint stamper 8 was obtained by removing any unnecessary portion(s) of the obtained stamper 8 through a punching process. This nickel stamper 8 was used as a master for nanoimprinting.

Silicon was deposited by sputtering to a thickness of 25 nm under high vacuum, $10^{-6}$ Pa on a 2-inch-square amorphous quartz wafer. Then, g-line photo resist (OFPR-800 TOKYO OHKA CO.) was diluted by PGMEA and spin-coated at 2000 rpm for 45 seconds onto the wafer. The film thickness was 70 nm. Then, it was set on the stage of a nanoimprint apparatus (not shown) and pressed at the pressure of 200 MPa at room temperature for 1 minute to imprint the stripe pattern of the nickel stamper.

The residual layer of photo resist between the stripes on silicon deposited amorphous quartz surface was removed by $CF_4/H_2$ RIE. Then, the silicon layer on the amorphous quartz wafer was etched by $SF_6$ RIE using the striped photo resist as a mask, at 10 sccm, 15 mTorr pressure, and 100 W of RF power (0.4 W/cm$^2$) for 50 seconds. The silicon layer on the amorphous quartz was etched as a pattern of ridges located beneath the original locations of the polystyrene cylinders.

The photo resist was then removed by immersing the assembly in alkali developer (2.38% tetramethyl ammonium hydroxide aqueous solution) and then acetone for 3 times.

Example 5

In this example, the same stamper was used which was made in Example 4. g-line photo resist (OFPR-800 TOKYO OHKA CO.) was diluted by PGMEA and spin-coated at 2000 rpm for 45 seconds onto a 2-inch-square amorphous quartz wafer. The film thickness was 70 nm. Then, it was set on the stage of nanoimprint apparatus and pressed at the pressure of 200 MPa at room temperature for 1 minute to imprint the stripe pattern of the nickel stamper. After removing the nickel stamper from the sample, it was annealed at 120 degrees Celsius for 5 minutes on the hotplate.

$CF_4/O_2$ RIE removed the residual layer of photo resist on amorphous quartz. Then, the amorphous quartz wafer was etched by $CF_4/H_2$ RIE using the photo resist as a mask, at $CF_4$ 5 sccm $H_2$ 5 sccm, 15 mTorr pressure, and 100 W of RF power (0.4 W/cm$^2$) for 50 seconds. The amorphous quartz was engraved 70 nm as a pattern of ridges located beneath the original locations of the polystyrene cylinders.

The photo resist was then removed by immersing the assembly in alkali developer (2.38% tetramethyl ammonium hydroxide aqueous solution) and by sonication.

Aluminum was then deposited onto the resulting striped pattern by sputtering under high vacuum, $10^{-6}$ Pa, for an aluminum film thickness of 25 nm, to complete the double layer polarizer.

Example 6

In this example, instead of using a 4-inch amorphous quartz wafer in Example 3, an artificial fluorite ($CaF_2$) wafer was used and the other process steps were the same.

Example 7

In this example, instead of using a 2-inch amorphous quartz wafer in Example 4, a fluorine-doped amorphous quartz wafer was used and the other process steps were the same.

Measuring the Polarization Efficiency of Deep UV Light:

In some examples, the polarization efficiency was measured with a UV spectrometer at 193 nm wavelength, and a vacuum UV spectrometer at 157 nm wavelength. Since there is no commercially available polarizer at these wavelengths, two pieces of polarizer samples were faced to each other, and transmittance of the light at both crossed ($T_\perp$) and parallel ($T_\parallel$) positions was measured. Then, the transmittance ($T_1$) and the polarization efficiency (PE) of one polarizer was calculated from:

$$T_1 = (T_\parallel)^{1/2}$$

$$PE = (T_\perp/T_\parallel)^{1/2}$$

|  | Transmittance | | Polarization Efficiency | |
|---|---|---|---|---|
|  | 193 nm | 157 nm | 193 nm | 157 nm |
| Example 1 | 60% | 40% | 80% | 40% |
| Example 2 | 30% | 20% | 95% | 85% |
| Example 3 | 60% | 40% | 85% | 70% |
| Example 4 | 30% | 20% | 95% | 85% |

-continued

|  | Transmittance | | Polarization Efficiency | |
|---|---|---|---|---|
|  | 193 nm | 157 nm | 193 nm | 157 nm |
| Example 5 | 15% | 15% | 95% | 90% |
| Example 6 | 30% | 30% | 95% | 85% |
| Example 7 | 60% | 40% | 95% | 85% |

Example 8

Figure 9:
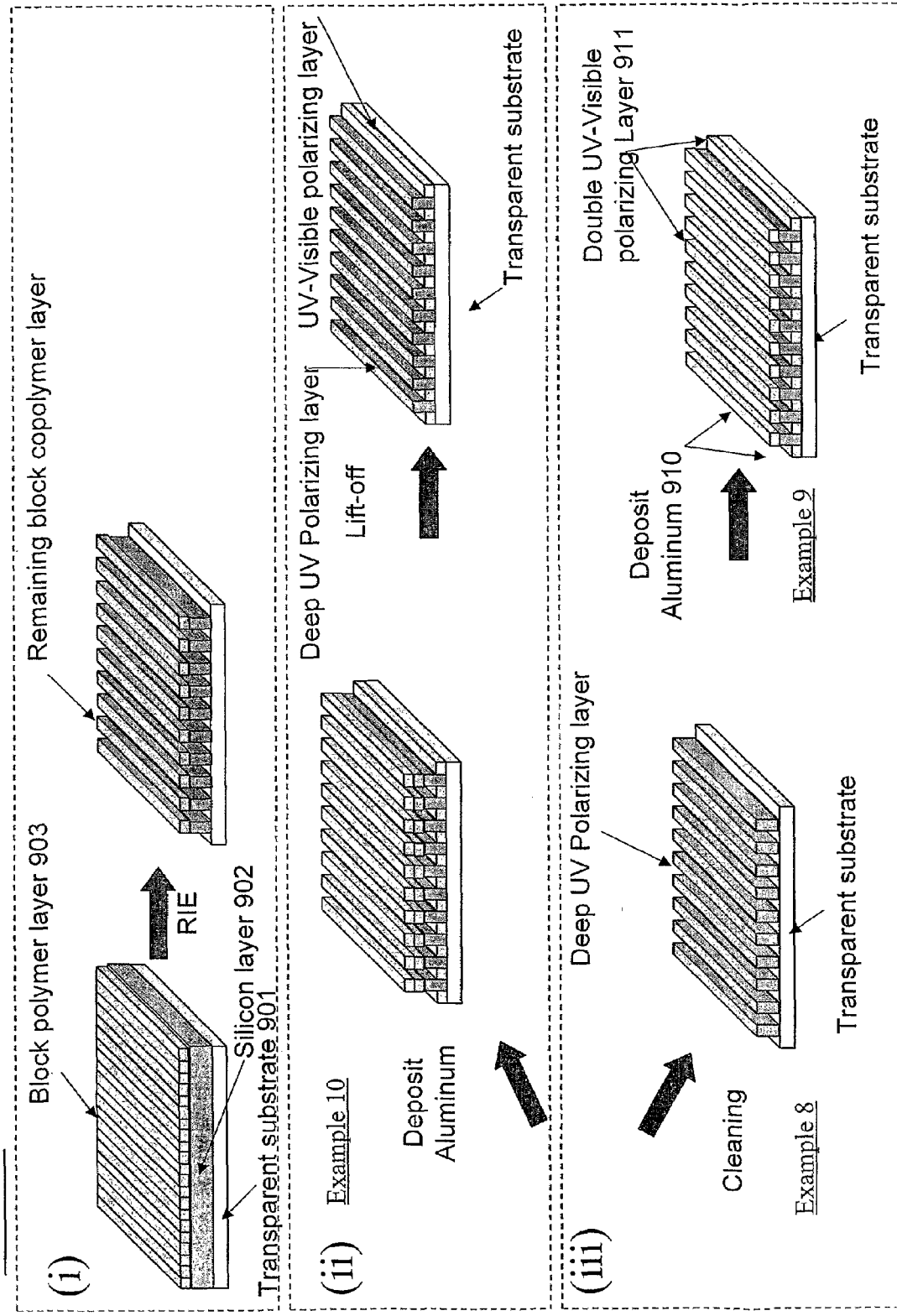
FIG. 9 is another flow diagram depicting various states within other methods for fabricating polarizing elements according to some embodiments of the present invention.

Referring to FIG. 9, in this example, as shown in the dashed-line region (i) in FIG. 9 silicon 902 was deposited by chemical vapor deposition to the thickness of 30 nm on a 4-inch amorphous quartz wafer 901. Next, a film of polystyrene-poly(n-hexylmethacrylate) diblock copolymer was deposited by spin-coating from a 1 wt % solution in toluene, at 4000 rpm for 45 seconds. The molecular weight of the polystyrene block was 21,000 g/mol and that of the poly(n-hexylmethacrylate) block was 64,000 g/mol, so that the morphology of the film had cylinders of polystyrene in a matrix of poly(n-hexylmethacrylate), with a period of 33 nm. The resulting thickness of the block copolymer film was 25 nm.

A cross-linked polydimethylsiloxane (PDMS) elastomer pad (Sylgard™ 184, of Dow Corning Corp.) was used to contact the top surface of the block copolymer film. The pad was pressed against the film with 300 g of force per square centimeter of pad area (30 kPa pressure) using a weight. A shear force was then applied to the PDMS pad at the level of 20 to 40 g per square centimeter of pad area (2 to 4 kPa stress). The stress was applied for 30 minutes at 150° C. Alignment of the block copolymer cylinders was confirmed by atomic force microscopy after shearing and removal of the PDMS pad.

The sample was exposed to the vapor of 0.5% aqueous solution of ruthenium tetraoxide (Electron Microscopy Sciences) for 2 minutes and the polystyrene block was stained by ruthenium.

The diblock copolymer was then etched by $CF_4$ RIE, 10 sccm, 15 mTorr pressure, and 100 W of RF power (0.4 W/cm$^2$). In this process, the poly(n-hexylmethacrylate) matrix was removed, and the silicon layer 902 underneath the block copolymer film 903 was also etched in the regions between, but not underneath, the polystyrene cylinders. Etching was performed to the depth of 35 nm.

As shown within the dashed-lined region (iii) in FIG. 9, the polymer was then removed by immersing in tetrahydrofuran and sonicating, then washing with a mixture of sulfuric acid and hydrogen peroxide. This resulted in a deep UV polarizing layer as shown.

Example 9

Referring again to FIG. 9, in this example, the same process was done as in Example 8. In addition, as shown in the dashed-line region (iii) in FIG. 9, aluminum 910 was then deposited onto the resulting striped pattern using an electron-beam evaporator, for an aluminum film thickness of 25 nm. Example 9 is depicted at the bottom of FIG. 9, with the resultant product creating in this illustrated example a double UV-Visible polarizing layer 911.

Example 10

Referring once again to FIG. 9, in this example, the same processes were performed as in Example 8, up to the removal of the remaining polymer by tetrahydrofuran. Then, as shown in the dashed-line region (ii) in FIG. 9, the sample was immersed in 1% hydrofluoric acid to wet-etch the surface of the amorphous quartz. Then, aluminum was deposited onto the resulting striped pattern using an electron-beam evaporator, for an aluminum film thickness of 25 nm. Then, the polymer was removed by immersing the assembly in tetrahydrofuran and sonicating, and then washing with a mixture of sulfuric acid and hydrogen peroxide.

|  | Transmittance | | | | Polarization Efficiency | | | |
| --- | --- | --- | --- | --- | --- | --- | --- | --- |
|  | 600 nm | 365 nm | 193 nm | 157 nm | 600 nm | 365 nm | 193 nm | 157 nm |
| Example 8 | 90% | 85% | 30% | 20% | 0% | 15% | 95% | 85% |
| Example 9 | 35% | 35% | 30% | 20% | 99% | 90% | 95% | 85% |
| Example 10 | 50% | 45% | 30% | 20% | 99% | 80% | 95% | 85% |

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspects within the present disclosure. The language "present invention" or "invention" should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A polarizing element comprising:
a substrate transparent to ultraviolet light;
a polarization layer on said substrate;
said polarization layer having polarization characteristics for ultraviolet light with a wavelength below 300 nm;
said polarization layer including an anisotropic striped structure that mainly consists of silicon parallel to said substrate;
said striped structure having an average continuous distance of two or more times said light's wavelength in a longitudinal direction and having an average interval less than half of said light's wavelength in a transverse direction;
wherein said striped structure is formed such that a plurality of the stripes have their longitudinal directions lying in parallel along a surface of the transparent substrate; and
wherein said polarization layer has a plasma frequency higher than a frequency of said ultraviolet light having a wavelength below 300 nm.

2. The polarizing element of claim 1, wherein said anisotropic striped structure includes wires spaced at an average interval of half said wavelength of said ultraviolet light or less.

3. The polarizing element of claim 2, wherein said wires are spaced at an average interval of less than about one third the wavelength of an incident light.

4. The polarizing element of claim 1, wherein said anisotropic striped structure includes wires spaced at intervals of less than about 100 nm.

5. The polarizing element of claim 4, wherein the wires are spaced at intervals of less than about 50 nm.

6. The polarizing element of claim 1, wherein said anisotropic striped structure includes wires having an average length of more than about 10 times said ultraviolet light wavelength.

7. The polarizing element of claim 6, wherein said anisotropic striped structure includes wires having an average length of less than about 10 microns.

8. The polarizing element of claim 1, wherein said anisotropic striped structure includes wires having a thickness of larger than about 10 nm.

9. The polarizing element of claim 1, wherein said anisotropic striped structure includes wires that mainly consist of silicon.

10. The polarizing element of claim 1, wherein said a polarization layer contains some contaminants but has a plasma frequency higher than a frequency of said ultraviolet light having a wavelength below 300 nm.

11. A polarizing element with a substrate transparent to incident light and a polarization layer having polarization characteristics for said incident light, said polarizing element comprising:
said polarization layer including an anisotropic striped structure parallel to said substrate:
said striped structure having an average continuous distance of two or more times said light's wavelength in a longitudinal direction and having an average interval less than half of said light's wavelength in a transverse direction;

a polarization layer including two layers of striped structures, with said two layers of striped structures oriented substantially parallel to and alternating transversely to each other, and wherein a distance between the two layers is smaller than an incident light wavelength;

wherein said one of said two layers is made with aluminum and the other of said two layers is made with silicon or a bilayer of silicon and aluminum;

wherein said two layers of striped structures are oriented in the same direction, and reflecting portions of said two layers are interdigitated; and wherein said polarization layer has a plasma frequency higher than a frequency of ultraviolet light having a wavelength below 300 nm.

12. The polarizing element of claim 11, wherein said other of said two layers that is made with silicon or a bilayer of silicon and aluminum includes wires that are made with silicon or a bilayer of silicon and aluminum, without silicon being in spaces between said wires.

13. A polarizing element with a substrate transparent to incident light and a polarization layer having polarization characteristics for said incident light, said polarizing element comprising:

said polarization layer including an anisotropic striped structure parallel to said substrate;

said striped structure having an average continuous distance of two or more times said light's wavelength in a longitudinal direction and having an average interval less than half of said light's wavelength in a transverse direction;

said polarization layer including alternative striped structures;

wherein said alternative striped structures includes transversely alternative wires of aluminum and silicon; and wherein said polarization layer has a plasma frequency higher than a frequency of ultraviolet light having a wavelength below 300 nm.

14. A method of manufacturing a polarizing element having polarization characteristics for incident ultraviolet light, comprising:

depositing silicon thin film on a transparent substrate; and generating a striped pattern in the silicon thin film by a lithographic method such as to create a polarizing element with a striped pattern that mainly consists of silicon, wherein said polarization element has a plasma frequency higher than a frequency of ultraviolet light having a wavelength below 300 nm.

15. The method of manufacturing of claim 14, wherein said lithographic method includes:

orienting cylindrical or lamellar microdomains of a block copolymer thin film on said substrate;

transferring said pattern of block copolymer microdomains into the silicon thin film on the substrate.

16. The method of manufacturing claim 14, wherein said lithographic method includes:

forming a thin layer of an organic polymer on said transparent substrate;

forming a thin layer of an inorganic substance on said organic polymer layer or said transparent substrate; and forming a thin layer of a block copolymer on said inorganic substance layer.

* * * * *